United States Patent
Kim et al.

(10) Patent No.: US 10,583,829 B2
(45) Date of Patent: Mar. 10, 2020

(54) PARKING ASSISTANCE SYSTEM

(71) Applicant: LG Electronics Inc., Seoul (KR)

(72) Inventors: Ilho Kim, Seoul (KR); Daebum Kim, Seoul (KR); Jinkyo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 15/856,794

(22) Filed: Dec. 28, 2017

(65) Prior Publication Data
US 2018/0345955 A1    Dec. 6, 2018

(30) Foreign Application Priority Data

May 30, 2017    (KR) .................. 10-2017-0067071

(51) Int. Cl.
| | |
|---|---|
| *B60W 30/06* | (2006.01) |
| *B60R 1/00* | (2006.01) |
| *B60W 50/08* | (2020.01) |
| *B62D 15/02* | (2006.01) |
| *B60Q 1/34* | (2006.01) |

(52) U.S. Cl.
CPC ............ *B60W 30/06* (2013.01); *B60Q 1/346* (2013.01); *B60R 1/00* (2013.01); *B60W 50/082* (2013.01); *B62D 15/028* (2013.01); *B62D 15/0285* (2013.01); *B60W 2420/42* (2013.01); *B60W 2420/52* (2013.01); *B60W 2420/54* (2013.01); *B60W 2540/04* (2013.01); *B60W 2550/10* (2013.01)

(58) Field of Classification Search
CPC .................................................. B60W 30/06
See application file for complete search history.

(56) References Cited

U.S. PATENT DOCUMENTS

| | | | | |
|---|---|---|---|---|
| 9,981,691 | B2* | 5/2018 | Azuma | B62D 15/021 |
| 2012/0197492 | A1* | 8/2012 | Schneider | B62D 15/028 |
| | | | | 701/41 |
| 2014/0163862 | A1* | 6/2014 | Choi | G01C 21/26 |
| | | | | 701/400 |
| 2016/0277671 | A1* | 9/2016 | Smeyers | H04N 5/23216 |

(Continued)

FOREIGN PATENT DOCUMENTS

| | | |
|---|---|---|
| DE | 102011086215 | 5/2013 |
| EP | 2982572 | 2/2016 |

(Continued)

OTHER PUBLICATIONS

European Search Report in European application No. 18174820.3, dated Dec. 5, 2018, 11 pages.

*Primary Examiner* — Alex C Dunn
(74) *Attorney, Agent, or Firm* — Fish & Richardson P.C.

(57) ABSTRACT

A parking assistance system for a vehicle includes: an object detection apparatus; at least one processor; and a computer-readable medium having stored thereon instructions that, when executed by the at least one processor, cause the at least one processor to perform operations that include: generating, through the object detection apparatus, information regarding an object located outside the vehicle; determining, based on the information regarding the object located outside the vehicle, that a parking space available outside the vehicle is a diagonal parking space; and generating a diagonal parking path for the vehicle to enter the parking space available outside the vehicle.

19 Claims, 21 Drawing Sheets

(56) References Cited

U.S. PATENT DOCUMENTS

| | | | |
|---|---|---|---|
| 2017/0137061 A1 | 5/2017 | Azuma | |
| 2019/0024430 A1* | 1/2019 | Jeromin | ............ G06K 9/00805 |
| 2019/0054927 A1* | 2/2019 | Hayakawa | ......... B62D 15/0285 |

FOREIGN PATENT DOCUMENTS

| | | |
|---|---|---|
| JP | 2010195224 | 9/2010 |
| JP | 2012001144 | 1/2012 |
| JP | 2012076483 | 4/2012 |
| JP | 2015048034 | 3/2015 |
| JP | 2016101778 | 6/2016 |
| KR | 2015028492 | 3/2015 |
| KR | 2017008459 | 1/2017 |
| WO | WO2014041209 | 3/2014 |
| WO | WO2018186406 | 10/2018 |

* cited by examiner

PARKING WILL BE PERFORMED ALONG PATH NO. 1

PARKING WILL BE PERFORMED ALONG PATH NO. 2

PARKING ASSISTANCE SYSTEM

CROSS-REFERENCE TO RELATED APPLICATION

This application claims the benefit of an earlier filing date and right of priority to Korean Patent Application No. 10-2017-0067071, filed on May 30, 2017 in the Korean Intellectual Property Office, the disclosure of which is incorporated herein by reference.

TECHNICAL FIELD

The present disclosure relates to a parking assistance system that is configured to perform a parking operation for a vehicle in a diagonal parking space.

BACKGROUND

A vehicle is an apparatus that moves in a direction desired by a user riding therein. A representative example of a vehicle may be an automobile.

A variety of sensors and electronic devices are typically mounted in vehicles for the convenience of a user who uses the vehicle. For example, an Advanced Driver Assistance System (ADAS) has been actively studied to improve driving convenience of a user. In addition, efforts have been being made to develop autonomous vehicles.

SUMMARY

Implementations are disclosed herein that provide a parking assistance system configured to determine whether a parking available space is a diagonal parking space, and to determine a diagonal parking path for the vehicle to enter the diagonal parking space.

In one aspect, a parking assistance system for a vehicle includes: an object detection apparatus; at least one processor; and a computer-readable medium having stored thereon instructions that, when executed by the at least one processor, cause the at least one processor to perform operations that include: generating, through the object detection apparatus, information regarding an object located outside the vehicle; determining, based on the information regarding the object located outside the vehicle, that a parking space available outside the vehicle is a diagonal parking space; and generating a diagonal parking path for the vehicle to enter the parking space available outside the vehicle.

In some implementations, determining that the parking space available outside the vehicle is a diagonal parking space includes: based on a determination that a plurality of parking spaces including the parking space is arranged along a first direction, generating a reference line that is formed along the first direction in which the plurality of parking spaces is arranged; and determining that the parking space available outside the vehicle is a diagonal parking space based on the reference line of the plurality of parking spaces and based on a side parking line of the parking space.

In some implementations, generating the reference line of the plurality of parking spaces is based on vertices of the plurality of parking spaces.

In some implementations, determining that the parking space available outside the vehicle is a diagonal parking space based on the reference line of the plurality of parking spaces and based on a side parking line of the parking space includes: determining that an angle between the side parking line of the parking space and the reference line of the plurality of parking spaces is an acute angle or an obtuse angle; and based on a determination that the angle between the side parking line of the parking space and the reference line of the plurality of parking spaces is an acute angle or an obtuse angle, determining that the parking space available outside the vehicle is a diagonal parking space.

In some implementations, determining that the parking space available outside the vehicle is a diagonal parking space based on the reference line of the plurality of parking spaces and based on a side parking line of the parking space includes: determining that a second vehicle is parked beside the parking space available outside the vehicle; determining that an angle between a line formed along a length direction of the second vehicle and the reference line of the plurality of vehicles is an acute angle or obtuse angle; and based on a determination that the second vehicle is parked beside the parking space and based on a determination that the angle between the line formed along the length direction of the second vehicle and the reference line is an acute angle or an obtuse angle, determining that the parking space available outside the vehicle is a diagonal parking space.

In some implementations, the object detection apparatus includes: a side sensor configured to detect an object located at a side of the vehicle; and a diagonal sensor configured to detect an object located in a diagonal direction of the vehicle. In such implementations, determining that the parking space available outside the vehicle is a diagonal parking space based on the reference line of the plurality of parking spaces and based on a side parking line of the parking space includes: based on a determination that a second vehicle is parked beside the parking space available outside the vehicle, and based on a determination that the side sensor does not detect an available parking space and the diagonal sensor detects an available parking space, determining that the parking space available outside the vehicle is a diagonal parking space.

In some implementations, generating the diagonal parking path for the vehicle to enter the parking space available outside the vehicle includes: determining, based on the information regarding the object outside the vehicle, a plurality of parking paths for the vehicle to enter the parking space; and selecting, as the diagonal parking path, one of the plurality of parking paths based on a user input.

In some implementations, the operations further include: in response to a selection of one of the plurality of parking paths, adjusting a scale of an AVM screen displayed on a display unit of the vehicle based on a region occupied by the selected parking path.

In some implementations, generating the diagonal parking path for the vehicle to enter the parking space available outside the vehicle includes: determining that a plurality of parking spaces including the parking space available outside the vehicle are arranged in a first direction; determining a reference lane for the vehicle that corresponds to a designated direction of travel past the plurality of parking spaces; and generating the diagonal parking path based on a location of the parking space available outside the vehicle, a side parking line of the parking space, the reference lane, and a location of the vehicle.

In some implementations, generating the diagonal parking path for the vehicle to enter the parking space available outside the vehicle includes: selecting one of a reverse parking maneuver or a forward parking maneuver based on an angle between the side parking line and the reference lane; and generating the diagonal parking path based on the selected one of the reverse parking maneuver or the forward parking maneuver.

In some implementations, selecting one of the reverse parking maneuver or the forward parking maneuver based on the angle between the side parking line and the reference lane includes: selecting the forward parking maneuver based on the angle between the side parking line and the reference lane being an acute angle; and selecting the reverse parking maneuver based on the angle between the side parking line and the reference lane being an obtuse angle.

In some implementations, selecting one of the reverse parking maneuver or the forward parking maneuver based on the angle between the side parking line and the reference lane further includes: based on a determination that a second vehicle is parked beside the parking space available outside the vehicle: determining an angle between the reference lane and a line formed along a length direction of the second vehicle; selecting the forward parking maneuver based on the angle between the reference lane and the line formed in the length direction of the different vehicle being an acute angle; and selecting the reverse parking maneuver based on the angle between the reference lane and the line formed in the length direction of the different vehicle being an acute angle.

In some implementations, generating the diagonal parking path for the vehicle to enter the parking space available outside the vehicle includes: in a state in which the diagonal parking path includes a reverse entry into the parking space: generating at least a portion of the diagonal parking path to deviate from the direction of the reference lane within a first angular range while forward-driving past the parking space, before reverse-driving into the parking space.

In some implementations, generating the diagonal parking path for the vehicle to enter the parking space available outside the vehicle includes: based on a determination that a plurality of parking spaces available outside the vehicle are diagonal parking spaces: selecting one of the plurality of parking spaces based on a user input; and generating a diagonal parking path for the vehicle to enter the selected parking space among the plurality of parking spaces.

In some implementations, the operations further include: outputting, via an output unit of the vehicle, a menu for selecting a manual parking mode or an autonomous parking mode; determining a user input that selects one of the manual parking mode or the autonomous parking mode; and based on a user selection of the autonomous parking mode, performing a control operation to autonomously park the vehicle along the generated diagonal parking path.

In some implementations, the operations further include: based on a determination that a driver of the vehicle is not properly handling a steering wheel of the vehicle, selecting the autonomous parking mode.

In some implementations, the operations further include: based on a user selection of the manual parking mode, outputting, via the output unit of the vehicle, parking guide information for manually driving the vehicle along the generated diagonal parking path.

In some implementations, the operations further include: based on a determination that the vehicle is in a reference lane and based on determining a plurality of parking spaces available on both sides of the reference lane that are determined to be diagonal parking spaces: determining at least one predicted parking space, based on locations and a tilt direction of the plurality of parking spaces and based on a location and a moving direction of the vehicle; and outputting, via an output unit of the vehicle, an image indicating the at least one predicted parking space.

In some implementations, the operations further include: outputting, via the output unit, an image indicating at least one parking space other than the predicted parking space from among the plurality of parking spaces.

In some implementations, the operations further include: activating a turn signal light corresponding to a direction in which the predicted parking space is located, based on the locations and the tilt direction of the plurality of parking spaces and based on the location and the driving direction of the vehicle.

In another aspect, a parking assistance system for a vehicle includes: an object detection apparatus configured to generate information regarding an object located outside the vehicle; and at least one processor configured to: determine, based on the information regarding the object located outside the vehicle, that a parking space available outside the vehicle is a diagonal parking space; and generate a diagonal parking path for the vehicle to enter the parking space available outside the vehicle.

In another aspect, a vehicle includes: a plurality of wheels; a power source configured to drive a rotation of at least one of the plurality of wheels; and a parking assistance system including: an object detection apparatus configured to generate information regarding an object located outside the vehicle; and at least one processor configured to: determine, based on the information regarding the object located outside the vehicle, that a parking space available outside the vehicle is a diagonal parking space; and generate a diagonal parking path for the vehicle to enter the parking space available outside the vehicle.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
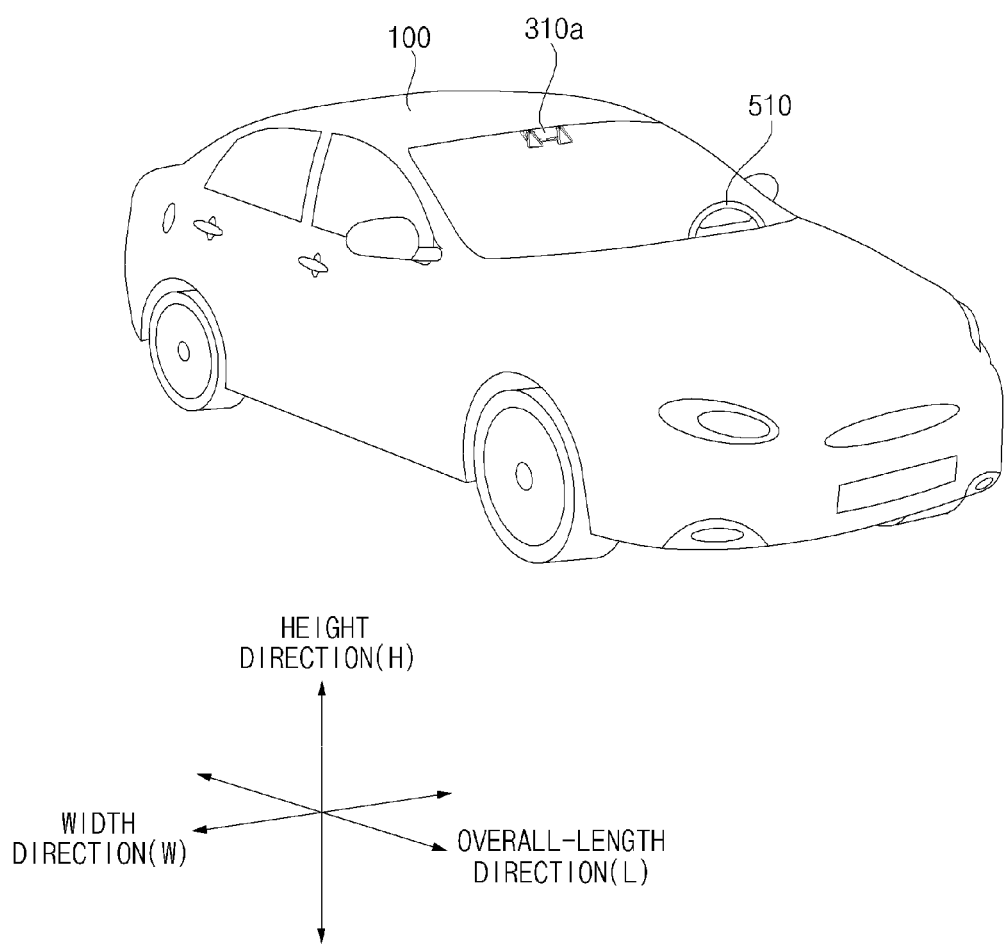
FIG. 1 is a diagram illustrating an example of an external appearance of a vehicle according to an implementation.

An autonomous parking technology may enable a vehicle to determine a parking space and to generate a parking path for the vehicle to enter the parking space.

In determining whether an area is a parking space, a vehicle may be configured to determine whether the area is a perpendicular parking space or a parallel parking space using various sensors and cameras. However, such vehicles may not be able to determine whether an area is a diagonal parking space.

In addition, such vehicles may not be able to determine a diagonal parking path that the vehicle should follow in order to park in the diagonal parking space. For example, parking in a diagonal parking space may involve determining whether to perform forward parking or reverse parking based on a tilt direction of the diagonal parking space.

Implementations are disclosed herein that provide a parking assistance system configured to determine whether a parking space is a diagonal parking space, and then to determine a diagonal parking path for the vehicle to follow in order to park in the diagonal parking space.

In some implementations, a parking assistance system determines an appropriate forward parking maneuver and/or a reverse parking maneuver based on a tilt direction and a tilt angle of a diagonal parking space.

In some scenarios, implementations disclosed herein have one or more effects as follows.

First, by determining whether a parking space is a diagonal parking space and then determining a parking path to park in the diagonal parking space, the parking assistance system may perform autonomous parking not just in a perpendicular parking space and a parallel parking space, but also in a diagonal parking space.

Second, by determining whether to perform forward parking or reverse parking in a diagonal parking space, the parking assistance system may perform fast and efficient parking in a diagonal parking space.

Third, by determining a predicted parking space based on movements of a vehicle and outputting guide information to guide a driver to the predicted parking space, the parking assistance apparatus may enable a driver to more easily manipulate the vehicle when performing manual parking in a diagonal parking space.

Effects of implementations disclosed herein are not limited to the aforementioned effects, and other effects may be achieved in some scenarios.

A vehicle as described in this specification may include any suitable vehicle, such as an automobile or a motorcycle. Hereinafter, description will be given based on an example of an automobile.

A vehicle as described in this specification may be powered by any suitable power source, and may include as examples an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward direction of the vehicle, and "the right side of the vehicle" refers to the right side in the forward direction of the vehicle.

FIGS. 1 to 7 are diagrams illustrating a vehicle having a parking assistance system according to the present disclosure. Hereinafter, the vehicle according to the present disclosure will be described with reference to FIGS. 1 to 7.

FIG. 1 is a diagram of the external appearance of a vehicle according to an implementation.

Figure 2:
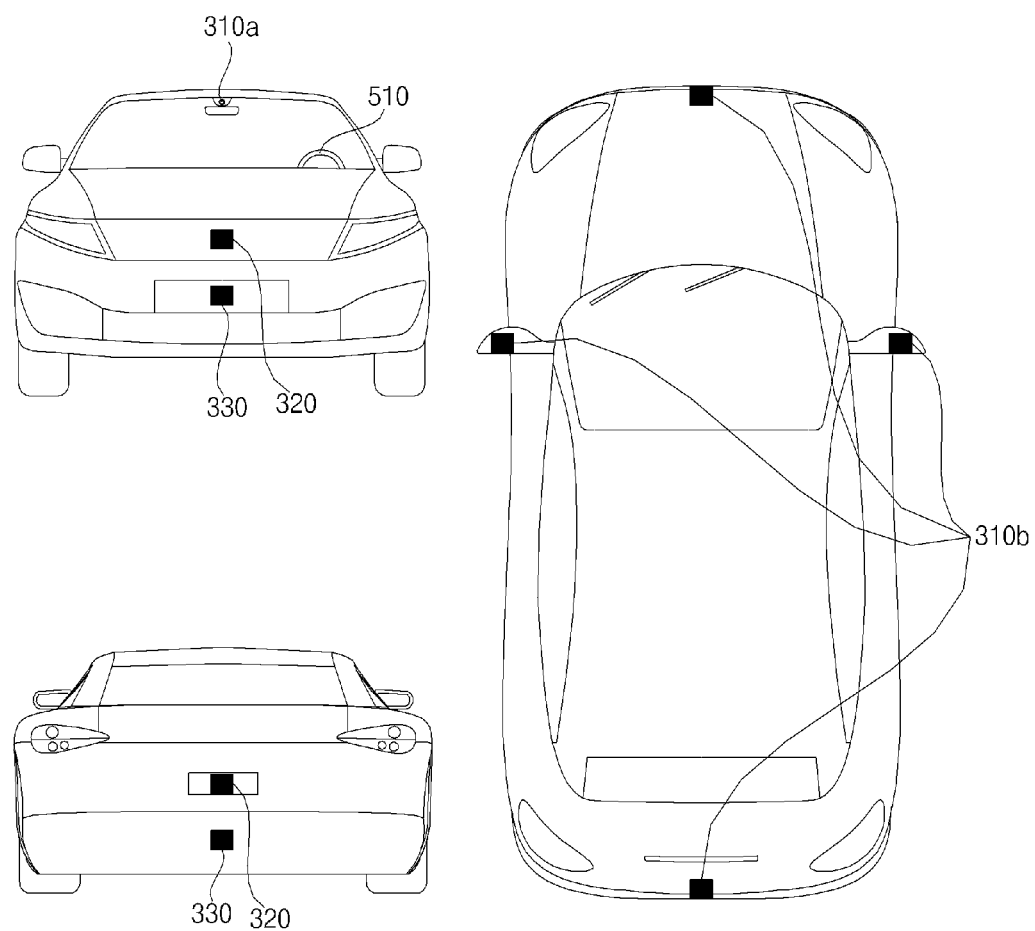
FIG. 2 is a diagram illustrating different angled views of a vehicle according to an implementation.

FIG. 2 is different angled views of a vehicle according to an implementation.

Figure 3:
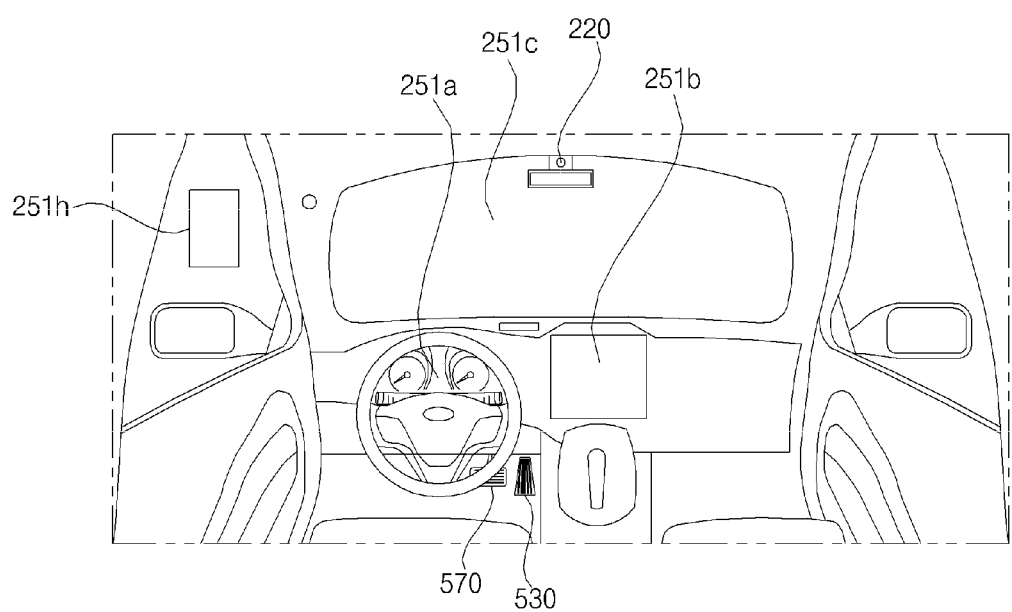
FIGS. 3 and 4 are diagrams illustrating an internal configuration of a vehicle according to an implementation.
Figure 4:
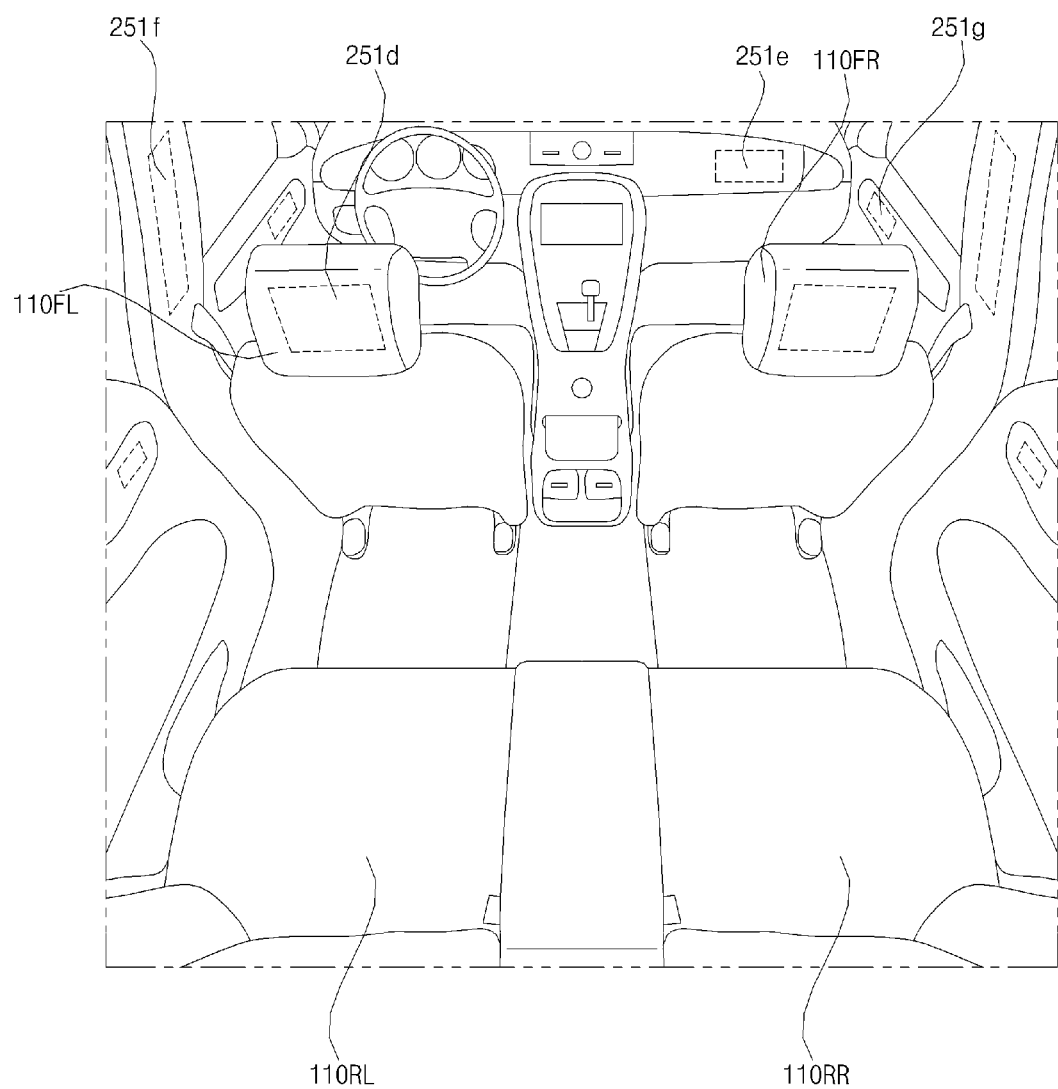

FIGS. 3 and 4 are diagrams of the internal configuration of a vehicle according to an implementation.

Figure 5:
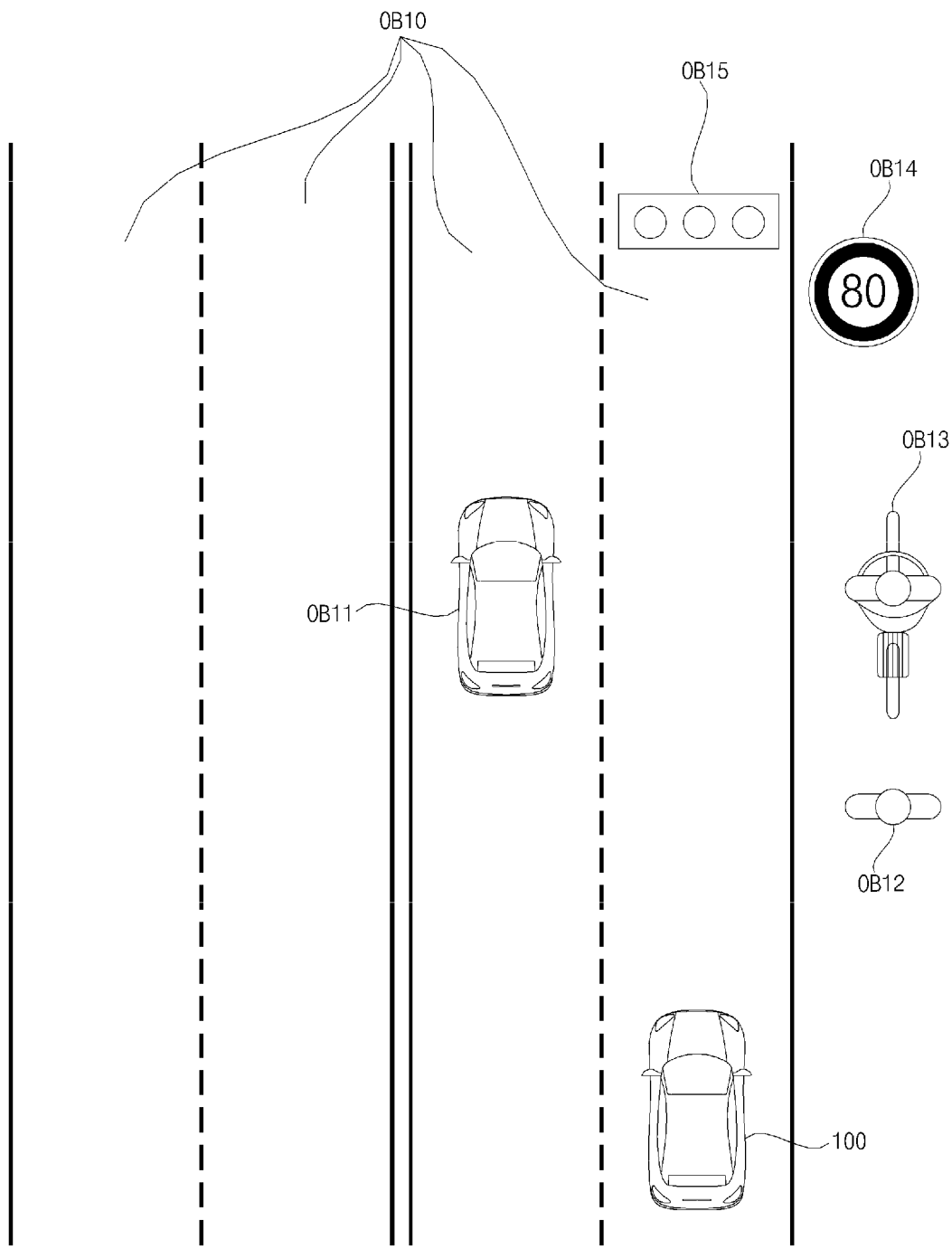
FIGS. 5 and 6 are diagrams illustrating objects that may be detected by a vehicle according to an implementation.
Figure 6:
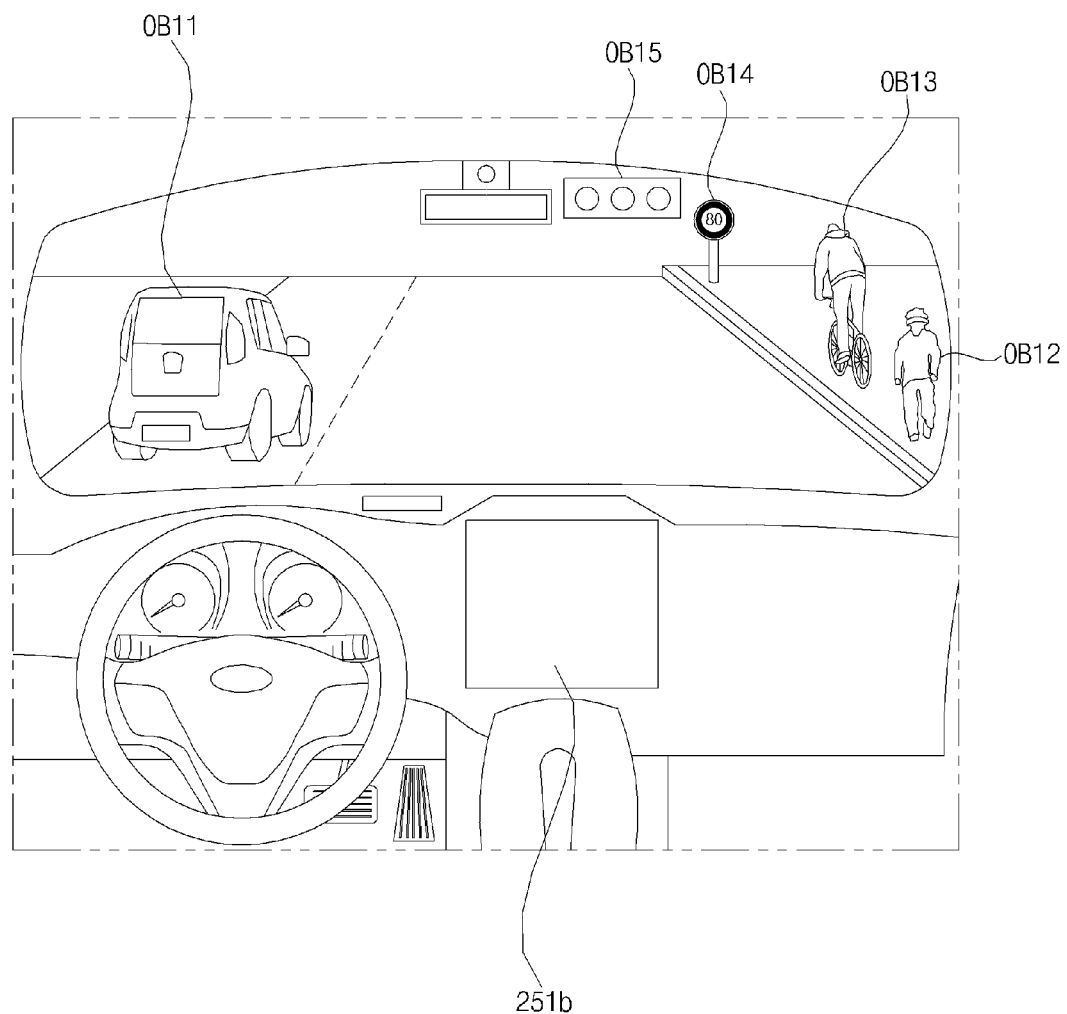

FIGS. 5 and 6 are diagrams for explanation of objects according to an implementation.

Figure 7:
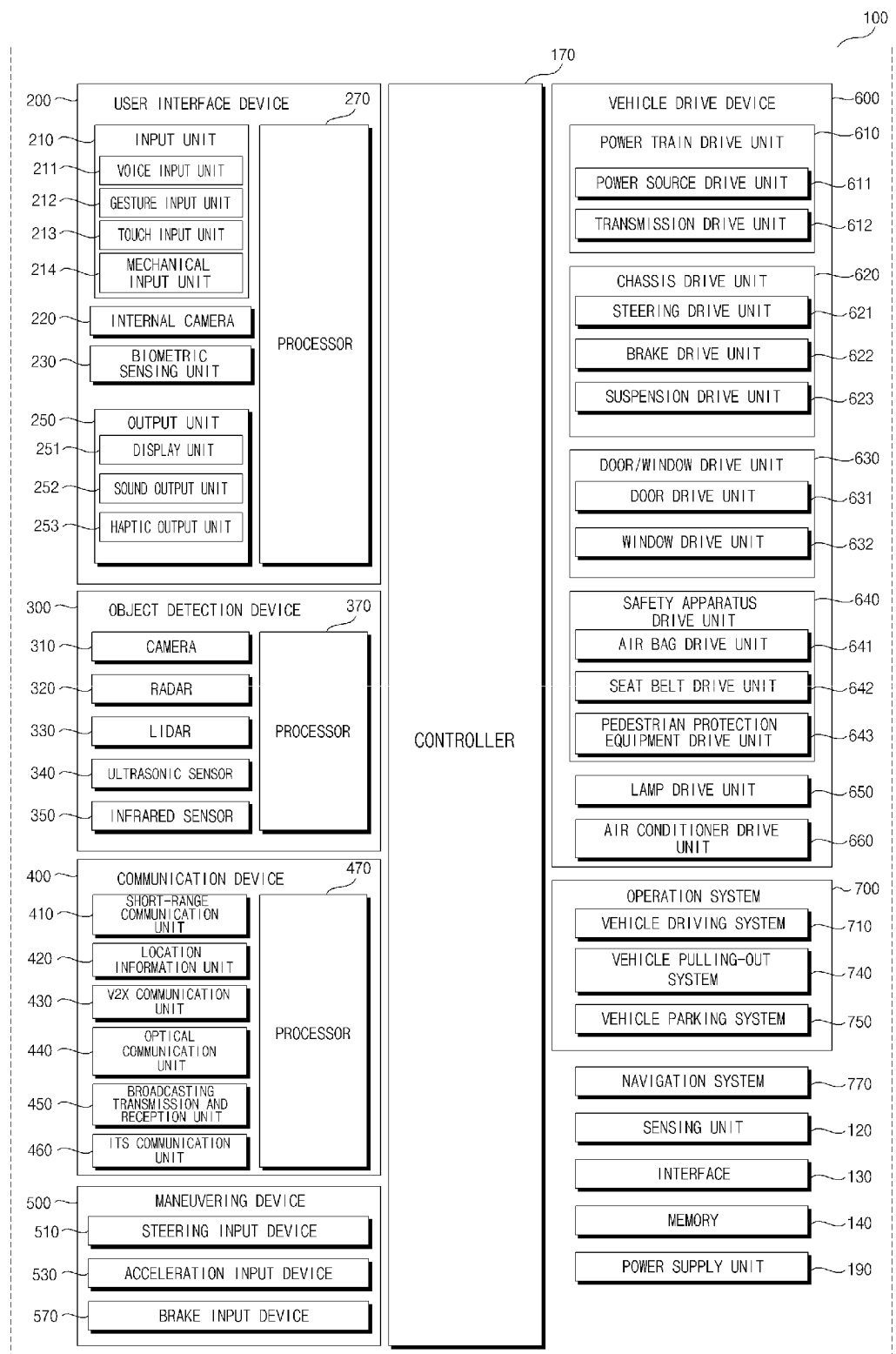
FIG. 7 is a block diagram illustrating an example of a vehicle according to an implementation.

FIG. 7 is a block diagram illustrating a vehicle according to an implementation.

Referring to FIGS. 1 to 7, a vehicle 100 may include a plurality of wheels, which are rotated by a power source, and a steering input device 510 for controlling a driving direction of the vehicle 100.

The vehicle 100 may include various driver assistant apparatuses. A driver assistant apparatus is a device that assists a driver based on information acquired from various sensors. The driver assistant apparatus may be referred to as an Advanced Driver Assistance System (ADAS).

The vehicle 100 may include various lighting devices for vehicle. A lighting device for vehicle may include a head lamp, a brake lamp, a tail lamp, a turn signal lamp, a room lamp, etc. In the following, the lighting device for vehicle will be described mainly about a head lamp. However, aspects of the present disclosure is not limited thereto, and the lighting device for vehicle may be a rear combination lamp. The rear combination lamp includes a brake lamp and a trail lamp.

The vehicle 100 may include a sensing device inside the vehicle 100, and a sensing device outside the vehicle 100.

The term "overall length" refers to a length from the front end to the rear end of the vehicle 100, the term "overall width" refers to a width of the vehicle 100, and the term "overall height" refers to a height from the bottom of the wheel to the roof. In the following description, the term "overall length direction L" refers to a reference direction for measurement of the overall length of the vehicle 100, the term "overall width direction W" refers to a reference direction for measurement of the overall width of the vehicle 100, and the term "overall height direction H" refers to a reference direction for measurement of the overall height of the vehicle 100.

In some implementations, the vehicle 100 may be an autonomous vehicle that autonomously performs one or more driving operations. The vehicle 100 may travel autonomously under the control of one or more processors, such as controller 170. The vehicle 100 may travel autonomously based on vehicle driving information.

The vehicle driving information may be information that is acquired by various units provided in the vehicle 100 during travelling of the vehicle 100. The vehicle driving information may be information used for controlling by the controller 170 or an operation system 700 to control the vehicle 100.

The vehicle driving information may include at least one of: object information acquired by an object detection apparatus 300, information received by a communication apparatus 400, and a user input received by a user interface apparatus 200 or a driving manipulation apparatus 500.

The object information may be information regarding the form, location, size, and/or color of an object sensed by the object detection apparatus 300. For example, the object information may be information regarding a lane, an obstacle, a nearby vehicle, a pedestrian, a traffic light, a road structure, content of a traffic sign plate, etc.

The information received by the communication apparatus 400 may be information transmitted and received by a device capable of performing communication. For example, the information received by the communication apparatus 400 may include at least one of the following: information transmitted by a nearby vehicle; information transmitted by a mobile terminal; information transmitted by a traffic infrastructure, and information existing in a specific network. The traffic infrastructure may include a traffic light, and the traffic light may transmit information about a traffic signal.

The vehicle driving information may include at least one of the following: navigation information; information on a control state of the vehicle 100; and location information of the vehicle 100. For example, the vehicle driving information may include: information on a nearby vehicle which is transmitted by the nearby vehicle; information on a travel route; and map information.

Based on vehicle driving information, the controller 170 may determine: a type, location, and movement of an object in the vicinity of the vehicle 100; whether a line exists in the vicinity of the vehicle 100; whether a stopping area exists in the vicinity of the vehicle 100; a probability of collision between the vehicle 100 and an object; a distribution of pedestrians or bicycles in the vicinity of the vehicle 100; a type of a road in which the vehicle 100 is travelling; a state of a traffic light in the vicinity of the vehicle 100; and movement of the vehicle 100.

Vehicle driving information may be acquired by at least one of the user interface apparatus 200, the object detection apparatus 300, the communication apparatus 400, the driving manipulation apparatus 500, the navigation system 770, a sensing unit 120, an interface unit 130, and a memory 140. The vehicle driving information, and may provide acquired information to the controller 170. Based on the vehicle driving information, the controller 170 may control the vehicle 100 to travel autonomously.

Occupant information may include a driver's image acquired using an internal camera 220 or the driver's biometric information sensed using a biometric sensor 230. For example, the occupant information may be an image about a location, a shape, an eye gaze, a face, a behavior, and a facial expression of an occupant, which is acquired using the internal camera 220. For example, the biometric information may be information on temperature, pulse, and brainwaves of an occupant, which is acquired using the biometric sensing unit 230. For example, based on occupant information, the controller 170 may determine a location, a shape, an eye gaze, a face, a behavior, a facial expression, dozing, a health condition, and an emotional state of an occupant. The occupant information may be acquired using the occupant sensing unit 240, and provided to the controller 170. In some implementations, the occupant information may be included in the aforementioned vehicle driving information.

Vehicle state information may be information on a state of various units provided in the vehicle 100. For example, the vehicle state information may include information on an operational state of the user interface apparatus 200, the object detection apparatus 300, the communication apparatus 400, the driving manipulation apparatus 500, a vehicle drive apparatus 600, and an operation system 700, and the vehicle state information may include information about whether there is an error in each unit. For example, based on vehicle state information, the controller 170 may determine whether a GPS signal of the vehicle 100 is properly received, whether there is an error in a sensor or camera provided in the vehicle 100, or whether each device provided in the vehicle 100 operates properly. In some implementations, the vehicle state information may be included in the aforementioned vehicle driving information.

Surrounding information may be information related to an environment in surroundings of the vehicle 100. For example, the surrounding information may include information on an object located outside the vehicle 100. The surrounding information may include information related to an environment external to the vehicle 100 among object information acquired by the object detection apparatus 300, information received by the communication apparatus 400, and information acquired by the user interface apparatus 200. Based on the surrounding information, the controller 170 may determine a location and a type of an object outside the vehicle 100, and a type and a geographical feature of a road outside the vehicle 100. In some implementations, the surrounding information may include the aforementioned vehicle driving information.

A control mode of the vehicle 100 may indicate a subject which controls the vehicle 100. For example, a control mode of the vehicle 100 may include: an autonomous mode in which the controller 170 or the operation system 700 included in the vehicle 100 controls the vehicle 100; a manual mode in which a driver in the vehicle 100 controls the vehicle 100; and a remote-control mode in which a device other than the vehicle 100 controls the vehicle 100.

When the vehicle 100 is in the autonomous vehicle, the controller 170 or the operation system 700 may control the vehicle 100 based on vehicle driving information. Accordingly, the vehicle 100 may travel without a user command received via the driving manipulation apparatus 500. For example, when the vehicle 100 is in the autonomous vehicle, the vehicle 100 may travel based on information, data, or a signal generated by a driving system 710, a parking-out system 710, and a parking system 750.

When the vehicle 100 is in the manual mode, the vehicle 100 may be controlled based on a user command for at least one of steering, acceleration, and deceleration, which is received via the driving manipulation apparatus 500. In this case, the driving manipulation apparatus 500 may generate an input signal corresponding to a user command, and provide the input signal to the controller 170. The controller 170 may control the vehicle 100 based on the input signal provided from the driving manipulation apparatus 500.

When the vehicle 100 is in the remote-control mode, a device other than the vehicle 100 may control the vehicle 100. When the vehicle 100 is in the remote-control mode, the vehicle 100 may receive a remote-control signal transmitted by another device via the communication apparatus 400. The vehicle 100 may be controlled based on a remote-control signal.

The vehicle 100 may enter one of the autonomous mode, the manual mode, and the remote-control mode based on a user input received through the user interface apparatus 200. A control mode of the vehicle 100 may switch to one of the autonomous mode, the manual mode, and the remote-control mode based on at least one of occupant information, vehicle driving information, and vehicle state information.

A control mode of the vehicle 100 may be switched from the manual mode to the autonomous mode, or vice versa, based on object information generated by the object detection apparatus 300. A control mode of the vehicle 100 may be switched from the manual mode to the autonomous mode, or vice versa, based on information received via the communication apparatus 400.

As illustrated in FIG. 7, the vehicle 100 may include the user interface apparatus 200, the objection detection apparatus 300, the communication apparatus 400, the manipulation apparatus 500, the vehicle drive apparatus 600, the operation system 700, a navigation system 770, a sensing unit 120, an interface 130, a memory 140, a controller 170, and a power supply unit 190.

The parking system according to some implementations may constitute a part of a configuration provided in the vehicle 100. For example, the parking assistant system may include the object detection apparatus 300 and the controller 170 provided in the vehicle 100.

Alternatively, in some implementations, the parking assistant system may be a device having elements different from those of the vehicle 100. In such scenarios, the parking assistant system may include an additional processor or controller, an object detection apparatus, a user interface apparatus, an interface unit, and/or a power supply unit. The interface unit may receive information or a signal provided from the controller 170 or the object detection apparatus 300 of the vehicle 100, and transmit a control signal from the controller of the parking assistant system to at least one of the controller 170, the vehicle drive apparatus 600, and the user interface apparatus 200. Accordingly, even the controller of the parking assistant system is able to acquire information acquired by each element of the vehicle 100 and control each element of the vehicle 100.

In the following description, the parking assistant system according to the present disclosure is considered to be a constituent element of the vehicle 100.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and one or more processor such as an interface processor 270.

In some implementations, the user interface apparatus 200 may further include other components in addition to the aforementioned components, or may not include some of the aforementioned components.

The input unit 210 is configured to receive a user command from a user, and data collected by the input unit 210 may be analyzed by the interface processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert a gesture input of a user into an electrical signal. The converted electrical signal may be provided to the interface processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for emitting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the interface processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the interface processor 270 or the controller 170.

The mechanical input unit 214 may be located on a steering wheel, a center fascia, a center console, a cockpit module, a door, etc.

The occupant sensing unit 240 may sense an occupant inside the vehicle 100. The occupant sensing unit 240 may include an internal camera 220 and a biometric sensing unit 230.

The internal camera 220 may acquire images of the inside of the vehicle 100. The processor 270 may sense a state of a user based on the images of the inside of the vehicle 100. For example, a sensed state of a user may be about a user's eye gaze, face, behavior, facial expression, and location.

Based on the image of the inside of the vehicle 100 acquired by the internal camera 220, the interface processor 270 may determine the user's eye gaze, face, behavior, facial expression, and location. The interface processor 270 may determine the user's gesture based on an image of the inside of the vehicle 100. The determination made by the interface processor 270 based on the image of the inside of the vehicle 100 may be referred to as occupant information. In this case, the occupant information is information indicating a user's eye gaze direction, behavior, facial expression, and gesture.

The interface processor 270 may provide the occupant information to the controller 170.

The biometric sensing unit 230 may acquire biometric information of the user. The biometric sensing unit 230 may include a sensor for acquire biometric information of the user, and may utilize the sensor to acquire the user's finger print information, heart rate information, brain wave information, etc. The biometric information may be used to authorize the user or to determine the user's state.

The interface processor 270 may determine a user's state based on a user's biometric information acquired by the biometric sensing unit 230. The user's state determined by the interface processor 270 may be referred to as occupant information. In this case, the occupant information is information indicating whether the user is in faint, dozing off, excited, or in an emergency situation. The interface processor 270 may provide the occupant information to the controller 170.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the interface processor 270 or the controller 170 into an audio signal, and outputs the audio signal. To this end, the sound output unit 252 may include one or more speakers. The haptic output unit 253 generates a tactile output.

For example, the tactile output is vibration. The haptic output unit 253 operates to vibrate a steering wheel, a safety belt, and seats 110FL, 110FR, 110RL, and 110RR so as to allow a user to recognize the output.

The interface processor 270 may control the overall operation of each unit of the user interface apparatus 200.

In some implementations, the user interface apparatus 200 may include a plurality of interface processors 270 or may not include the interface processor 270.

In a case where the user interface apparatus 200 does not include the interface processor 270, the user interface apparatus 200 may operate under the control of the controller 170 or a processor of a different device inside the vehicle 100.

In some implementations, the user interface apparatus 200 may be referred to as a multimedia device for vehicle.

The user interface apparatus 200 may operate under the control of the controller 170.

The objection detection apparatus 300 is configured to detect an object located outside the vehicle 100.

The object may include various objects related to travelling of the vehicle 100.

Referring to FIGS. 5 and 6, an object o may include a lane OB10, a line distinguishing the lane OB10, a nearby vehicle OB11, a pedestrian OB12, a two-wheeled vehicle OB13, a traffic signal OB14 and OB15, a curb for distinguishing a sidewalk a light, a road, a structure, a bump, a geographical feature, an animal, etc.

The lane OB10 may be a driving lane in which the vehicle 100 is traveling, a lane next to the driving lane, and a lane in which an opposing vehicle is travelling. The lane OB10 may include left and right lines that define the lane.

The nearby vehicle OB11 may be a vehicle that is travelling in the vicinity of the vehicle 100. The nearby vehicle OB11 may be a vehicle located within a predetermined distance from the vehicle 100. For example, the nearby vehicle OB11 may be a vehicle that is preceding or following the vehicle 100. For example, the nearby vehicle OB11 may be a vehicle travelling on a lane next to a lane in which the vehicle 100 is travelling.

The pedestrian OB12 may be a person in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle that is in the vicinity of the vehicle 100 and moves using two wheels. The two-wheeled vehicle OB13 may be a vehicle that has two wheels located within a predetermined distance from the vehicle 100. For example, the two-wheeled vehicle OB13 may be a motorcycle or a bike on a sidewalk or the roadway.

The traffic signal OB14 and OB15 may include a traffic light OB15, a traffic sign plate OB14, and a pattern or text painted on a road surface.

The light may be light generated by a lamp provided in the nearby vehicle OB11. The light may be light generated by a street light. The light may be solar light.

The road may include a road surface, a curve, and slopes, such as an upward slope and a downward slope. The geographical feature may include a mountain, a hill, etc.

The structure may be a body located around the road in the state of being fixed onto the ground. For example, the structure may include a streetlight, a roadside tree, a building, a traffic light, a bridge, a curb, a guardrail, etc.

The object may be classified as a movable object or a stationary object. The movable object is an object which is capable of moving. For example, the movable object may include a nearby vehicle and/or a pedestrian. By contrast, the stationary object is an object which does not move. For example, the stationary object may include a traffic signal, a road, a structure, or a line or marking on the road.

The object detection apparatus 200 may detect an obstacle located outside the vehicle 100. The obstacle may be an object, a puddle on the road, an uphill start point, a downhill start point, an inspection pit, a bump, or a curb. The object may have a volume and a mass.

The objection detection apparatus 300 may include a camera 310, a Radio Detection and Ranging (RADAR) 320, a Light Detection and Ranging (LIDAR) 330, an ultrasonic sensor 340, an infrared sensor 350, and at least one processor such as a detection processor 370.

In some implementations, the objection detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide an acquired image to the detection processor 370. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The RADAR 320 may include an electromagnetic wave transmission unit and an electromagnetic wave reception unit. The RADAR 320 may be realized as a pulse RADAR or a continuous wave RADAR depending on the principle of emission of an electronic wave. In addition, the RADAR 320 may be realized as a Frequency Modulated Continuous Wave (FMCW) type RADAR or a Frequency Shift Keying (FSK) type RADAR depending on the waveform of a signal.

The RADAR 320 may detect an object through the medium of an electromagnetic wave by employing a time of flight (TOF) scheme or a phase-shift scheme, and may detect a location of the detected object, the distance to the detected object, and the speed relative to the detected object.

The RADAR 320 may be located at an appropriate position outside the vehicle 100 in order to sense an object located in front of the vehicle 100, an object located to the rear of the vehicle 100, or an object located to the side of the vehicle 100.

The LIDAR 330 may include a laser transmission unit and a laser reception unit. The LIDAR 330 may be implemented by the TOF scheme or the phase-shift scheme. The LIDAR 330 may be implemented as a drive type LIDAR or a non-drive type LIDAR.

When implemented as the drive type LIDAR, the LIDAR 300 may rotate by a motor and detect an object in the vicinity of the vehicle 100.

When implemented as the non-drive type LIDAR, the LIDAR 300 may utilize a light steering technique to detect an object located within a predetermined distance from the vehicle 100.

The LIDAR 330 may detect an object through the medium of laser light by employing the TOF scheme or the phase-shift scheme, and may detect a location of the detected object, the distance to the detected object, and the speed relative to the detected object.

The LIDAR 330 may be located at an appropriate position outside the vehicle 100 to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 to sense an object located in front of the vehicle 100, an object located to the rear of the vehicle 100, or an object located to the side of the vehicle 100.

The detection processor 370 may control the overall operation of each unit included in the objection detection apparatus 300.

The detection processor 370 may detect and track an object based on acquired images. Using an image processing algorithm, the detection processor 370 may: calculate the distance to the object and the speed relative to the object; determine an object's type, location, shape, color, and expected route; and determine content of a detected text.

The detection processor 370 may detect and track an object based RADAR, Radio Detection and Ranging which is formed as the result of reflection a transmission electromagnetic wave by the object. Based on the electromagnetic wave, the detection processor 370 may, for example, calculate the distance to the object and the speed relative to the object.

The detection processor 370 may detect and track an object based on a reflection laser light which is formed as the result of reflection of transmission laser by the object. Based on the laser light, the detection processor 370 may, for example, calculate the distance to the object and the speed relative to the object.

The detection processor 370 may detect and track an object based on a reflection ultrasonic wave which is formed as the result of reflection of a transmission ultrasonic wave by the object. Based on the ultrasonic wave, the detection processor 370 may, for example, calculate the distance to the object and the speed relative to the object.

The detection processor 370 may detect and track an object based on reflection infrared light which is formed as the result of reflection of transmission infrared light by the object. Based on the infrared light, the detection processor 370 may, for example, calculate the distance to the object and the speed relative to the object.

The detection processor 370 may generate object information based on at least one of the following: an image acquired using the camera 310, a reflected electromagnetic wave received using the RADAR 320, a reflected laser beam received using the LIDAR 330, a reflected ultrasonic wave received using the ultrasonic sensor 340, and a reflected infrared light received using the infrared sensor 350.

Object information may be information on a type, a location, a size, a shape, a color, a route, and a speed of an object in the vicinity of the vehicle 100, and content of a detected text.

For example, the object information may indicate the following: whether there is a lane in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle. The object information may be included in vehicle driving information.

The detection processor 370 may provide generated object information to the controller 170.

In some implementations, the objection detection apparatus 300 may include a plurality of detection processors 370 or may not include the processor 370. For example, each of the camera 310, the RADAR 320, the LIDAR 330, the ultrasonic sensor 340, and the infrared sensor 350 may include an individual processor.

The objection detection apparatus 300 may operate under the control of the controller 170 or a processor inside the vehicle 100.

The communication apparatus 400 is configured to perform communication with an external device. Here, the external device may be one of a nearby vehicle, a mobile terminal, and a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as a communication processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS) module.

The location information unit 420 may acquire GPS information using a GPS module. The location information unit 420 may transfer the acquired GPS information to the controller 170 or the communication processor 470. The GPS information acquired by the location information unit 420 may be used for autonomous travelling of the vehicle 100. For example, based on GPS information and navigation information acquired using the navigation system 770, the controller 170 may control the vehicle 100 to travel autonomously.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication). The V2X communication unit 430 may include a radio frequency (RF) circuit that is capable of implementing protocols for the V2I communication, the V2V communication, and V2P communication.

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 performs communication with a server that provides an intelligent traffic system. The ITS communication unit 460 may receive information on various traffic situations from the server of the intelligence traffic system. Information on a traffic situation may include a level of traffic congestion, a traffic situation on each road, and an amount of traffics in each area.

The communication processor 470 may control the overall operation of each unit of the communication apparatus 400.

Vehicle driving information may include information received using at least one of the short-range communication unit 410, the location information unit 420, the V2X communication unit 430, the optical communication unit 440, and the broadcast transmission and reception unit 450.

For example, vehicle driving information may include information received from a nearby vehicle, the information which is about a location, a model, route, speed, various sensed values, etc. of a nearby vehicle. When information on various sensed values of the nearby vehicle is received, the controller 170 may acquire information on various objects in the vicinity of the vehicle 100, even though the vehicle 100 does not include an additional sensor.

In some implementations, the communication apparatus 400 may include a plurality of communication processors 470, or may not include a communication processor 470.

In a case where the communication apparatus 400 does not include the communication processor 470, the communication apparatus 400 may operate under the control of the controller 170 or a processor of a device inside the vehicle 100.

In some implementations, the communication apparatus 400 may implement a vehicle multimedia device, together with the user interface apparatus 200. In this case, the vehicle multimedia device may be referred to as a telematics device or an Audio Video Navigation (AVN) device.

The communication apparatus 400 may operate under the control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user command for steering the vehicle 100. The user command for steering may be a command corresponding to a specific steering angle. For example, a user command for steering may correspond to 45 degrees to right.

The steering input device 510 may take the form of a wheel to enable a steering input through the rotation thereof. In this case, the steering input device 510 may be referred to as a steering wheel or a handle.

In some implementations, the steering input device may be provided as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal.

In some implementations, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include at least one processor. Each unit of the vehicle drive apparatus 600 may include its own processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under the control of the controller 170.

In a case where an electric motor is the power source, the power source drive unit 611 may control the motor. The power source drive unit 610 may control, for example, the RPM and toque of the motor under the control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the driving direction of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner to supply cool air to the inside of the vehicle 100.

The vehicle drive apparatus 600 may include a processor. Each unit of the vehicle dive device 600 may include its own processor.

The vehicle drive apparatus 600 may operate under the control of the controller 170.

The operation system 700 is a system for controlling the overall driving operation of the vehicle. The operation system 700 may operate in the autonomous driving mode. The operation system 700 may perform autonomous driving of the vehicle 100 based on location information of the vehicle 100 and navigation information. The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include at least one processor. Each unit of the operation system 700 may include its own processor(s).

In some implementations, in a case where the operation system 700 is implemented as software, the operation system 700 may be implemented by at least one processor, such the controller 170.

In some implementations, the operation system 700 may include at least one selected from among the user interface apparatus 200, the objection detection apparatus 300, the communication apparatus 400, the vehicle drive apparatus 600, or the controller 170.

The driving system 710 may perform driving of the vehicle 100.

The driving system 710 may perform autonomous driving of the vehicle 100 by providing a control signal to the vehicle drive apparatus 600 based on location information of the vehicle 100 and navigation information received from the navigation system 770.

The driving system 710 may perform driving of the vehicle 100 by providing a control signal to the vehicle drive apparatus 600 based on object information received from the objection detection apparatus 300.

The driving system 710 may perform driving of the vehicle 100 by providing a control signal to the vehicle drive apparatus 600 based on a signal received from an external device through the communication apparatus 400.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on location information of the vehicle 100 and navigation information received from the navigation system 770.

The parking-out system 740 may perform an operation of pulling the vehicle 100 out of a parking space, by providing a control signal to the vehicle drive apparatus 600 based on object information received from the objection detection apparatus 300.

The parking-out system 740 may perform an operation of pulling the vehicle 100 out of a parking space, by providing a control signal to the vehicle drive apparatus 600 based on a signal received from an external device.

The parking system 750 may perform an operation of parking the vehicle 100 in a parking space.

The parking system 750 may perform an operation of parking the vehicle 100 in a parking space, by providing a control signal to the vehicle drive apparatus 600 based on location information of the vehicle sd100 and navigation information received from the navigation system 770.

The parking system 750 may perform an operation of parking the vehicle 100 in a parking space, by providing a control signal to the vehicle drive apparatus 600 based on object information received from the objection detection apparatus 300.

The parking system 750 may perform an operation of parking the vehicle 100 in a parking space, by providing a control signal to the vehicle drive apparatus 600 based on a signal received from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, ambient illumination information, information about the pressure applied to an accelerator pedal, and information about the pressure applied to a brake pedal. Information acquired by the sensing unit 120 may be included in vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under the control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under the control of the controller 170. In particular, the power supply unit 190 may receive power from, for example, a battery inside the vehicle 100.

The controller 170 may control overall operation of each unit of the vehicle 100.

The controller 170 may be referred to as an Electronic Control Unit (ECU).

When the vehicle 100 is in an autonomous mode, the controller 170 may perform autonomous driving of the vehicle 100 based on information acquired using a device provided in the vehicle 100. For example, the controller 170 may control the vehicle 100 based on navigation information provided from the navigation system 770 or information provided from the object detection apparatus 300 or the communication apparatus 400. When the vehicle 100 is in a manual mode, the controller 170 may control the vehicle 100 based on an input signal corresponding to a user input that is received by the driving manipulation apparatus 500. When the vehicle 100 is in a remote-control mode, the controller 170 may control the vehicle 100 based on a remote control signal received by the communication apparatus 400.

Various processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The parking assistant system according to an implementation may include the object detection apparatus 300 and the controller 170.

The object detection apparatus 300 may detect an object located outside the vehicle 100. The object may include, for example, a physical object, the ground or road, a line painted or marked on the ground or road, or a geographical feature.

The object detection apparatus 300 may include at least one of a camera 310, a radar, a lidar, an ultrasonic sensor, or an infrared sensor, as examples.

The object detection apparatus 300 may generate information on an object located outside the vehicle 100. The information on an object located outside the vehicle 100 may be referred to as object information. For example, the object information may be an image captured by the camera 310. The object information may be location and distance information acquired using at least one of the radar, the lidar, the ultrasonic sensor, and the infrared sensor.

The object detection apparatus 300 may provide generated object information to the controller 170. Based on the object information provided from the object detection apparatus 300, the controller 170 may determine whether a parking available space exists outside the vehicle 100. The parking available space is a space to which the vehicle 100 is allowed to move from the current location for parking. Based on the object information, the controller 170 may determine a location of the parking allowed space.

For example, when parking lines are detected from an image captured by the camera 310 and a space defined by the parking lines is found empty, the controller 170 may determine the space to be a parking available space. In addition, when it is found, based on location and distance information provided by various sensors, that there is an empty space between other vehicles into which the vehicle 100 is able to move for parking, the controller 170 may determine that a parking available space exists.

Hereinafter, the parking assistant system according to an implementation will be described in detail with reference to FIGS. 8 to 19.

Figure 8:
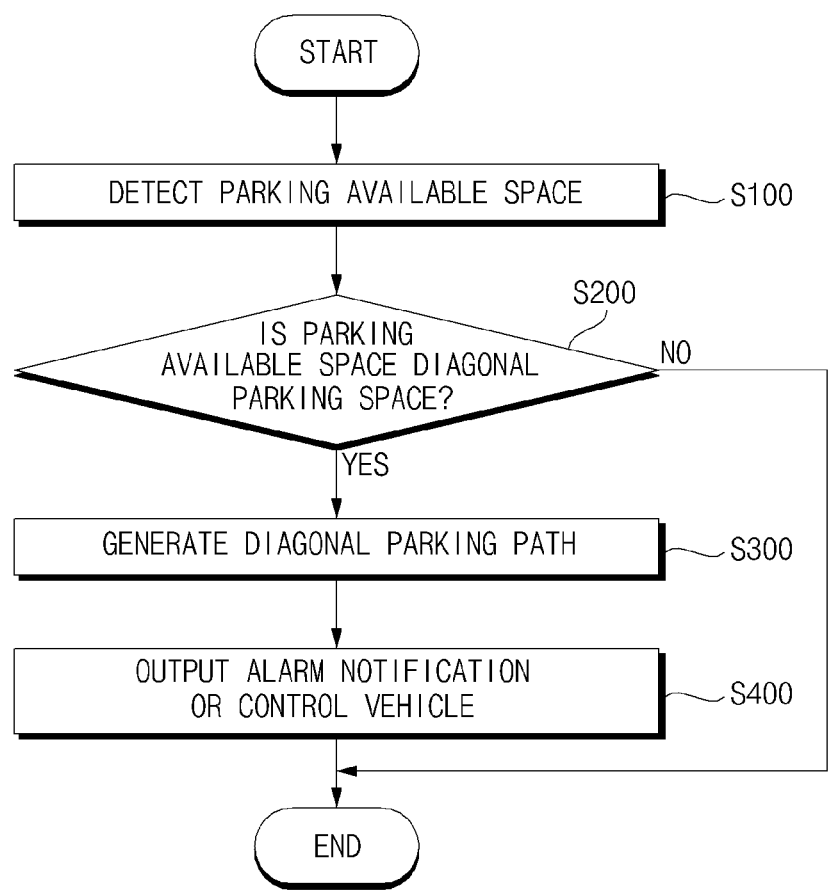
FIG. 8 is a flowchart illustrating an example of an operation of a parking assistance system according to an implementation.

FIG. 8 is a flowchart illustrating operation of a parking assistance system according to an implementation.

The controller 170 may detect a parking available space based on object information in S100.

Based on the object information, the controller 170 may determine whether the parking available space is a diagonal parking space in S200.

When it is determined that there is a plurality of parking spaces including the parking available space and arranged in one direction, the controller 170 may determine whether the parking available space is a diagonal parking space based on side parking lines of the parking available space and a reference line.

The reference line is a line formed in a direction in which the plurality of parking spaces is arranged. The reference line may be a line painted on the ground or may be a virtual line set by the controller 170. For example, the controller 170 may generate the reference line based on vertexes of the plurality of parking spaces. The reference line will be described later in more detail with reference to FIG. 10.

The diagonal parking space is a parking space tilted at a specific angle relative to a driving direction of the vehicle 100. The direction in which the diagonal parking space is tilted and the driving direction of the vehicle 100 are not parallel or perpendicular to each other, but form an acute or obtuse angle. For example, the diagonal parking space may be a parking space tilted at approximately 45 degrees relative to a direction of a nearby road.

The diagonal parking space will be described later in more detail with reference to FIG. 9.

When it is determined that an angle between a side parking line of a parking available space and a reference line is an acute or obtuse angle, the controller 170 may determine that the parking available space is a diagonal parking space.

In addition, when it is determined that a different vehicle is parked beside a parking available space and that an angle between a line formed in an overall length direction of the different vehicle and a reference line is an acute or obtuse angle, the controller 170 may determine that the parking available space is a diagonal parking space. A method of determining a diagonal parking space will be described later in more detail with reference to FIG. 11.

The object detection apparatus 300 may include a side sensor configured to detect an object located on a side of the vehicle 100, and a diagonal sensor configured to detect an object located in a diagonal direction of the vehicle 100. In this case, a sensor may be any one of a radar, a lidar, an ultrasonic sensor, and an infrared sensor. The side sensor may be a sensor arranged left or right to the vehicle 100. Accordingly, a direction in which the side sensor detects an object may be exactly or nearly perpendicular to the overall length direction of the vehicle. The diagonal sensor may be a sensor arranged in a forward diagonal direction or a backward diagonal direction of the vehicle 100. Accordingly, the diagonal sensor may be disposed at approximately 45 degrees relative to a direction for detection of an object or relative to the overall length direction of the vehicle 100. Or, an angle between the direction in which the diagonal sensor senses an object and the overall length direction of the vehicle may be about 45 degrees.

When it is determined that a different vehicle is parked beside a parking available space and that there is an area which is not sensed by the side sensor but sensed by the diagonal sensor due to the presence of the different vehicle, the controller 170 may determine that the parking available space is a diagonal parking space. Detailed description thereof will be provided with reference to FIG. 12.

When it is determined that the parking available space is a diagonal parking space, the controller 170 may generate a diagonal parking path for the vehicle 100 to enter the parking available space in S300.

The diagonal parking path is a path for the vehicle 100 to enter the parking available space. The diagonal parking path will be described later in more detail with reference to FIG. 9.

The controller 170 may output an alarm notification to guide the generated diagonal parking path, or may perform a control operation so that the vehicle is parked in the parking available space along the diagonal parking path in S400.

When the diagonal parking path is generated, the controller 170 may enter a manual parking mode or an autonomous parking mode based on a user input. If entering the manual parking mode, the controller 170 may output an alarm notification through the output unit 250 of the vehicle 100.

The alarm notification may be at least one of an image displayed by the display unit 251 or sound output by the sound output unit 250. For example, the alarm notification may be an arrow image indicating the diagonal parking path. For example, the alarm notification may be voice that guide the vehicle 100 to move along the diagonal parking path.

If entering the autonomous parking mode, the controller 170 may control the vehicle drive apparatus 600 so that the vehicle 100 move along the diagonal parking path.

Figure 9:
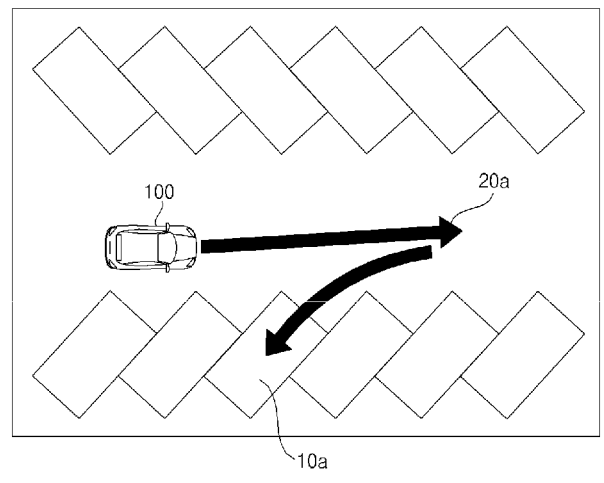
FIG. 9 is a diagram illustrating an example of a diagonal parking space and a diagonal parking path determined by a parking assistance system according to an implementation.
Figure 9:
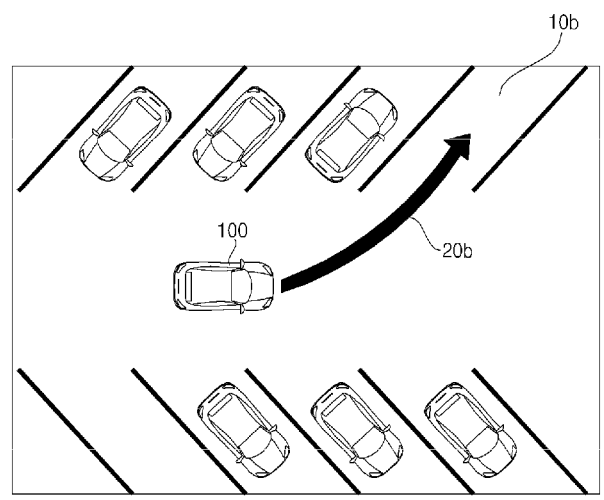
Figure 9:
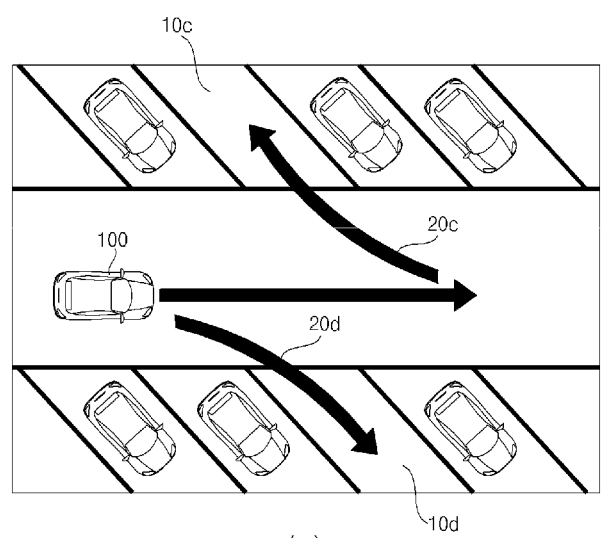

FIG. 9 is a diagram illustrating a diagonal parking space and a diagonal parking path determined by a parking assistant system according to an implementation.

A parking space may be a space defined by parking lines painted on the ground. The controller 170 may detect a parking line painted on the ground from an image captured by the camera 310, and determine a location of the parking space based on a location and a shape of the detected parking line.

Types of a parking space may include a perpendicular parking space, a parallel parking space, and a diagonal parking space. The perpendicular parking space is a parking space which causes vehicles to be parked in a side direction. The parallel parking space is a parking space which causes vehicles to be parked in an overall length direction. The diagonal parking space is a parking space which causes vehicles to be parked at a specific angle and arranged in one direction.

A parking available space is a parking space in which a vehicle is allowed to be parked. For example, a parking space in which a different vehicle is parked is not a parking available space. A parking space which a vehicle is not allowed to enter despite of no vehicle parked therein is not a parking available space as well.

The side parking line is a parking line existing on a side of a vehicle, when the vehicle plans to be parked in a parking space. The side parking line is a parking line corresponding to a long edge of a rectangular parking space.

As shown in the top-most example of FIG. 9, a parking space may be an inner space of a rectangle painted on the ground. If there are a plurality of rectangles respectively indicating parking spaces, a plurality of parking spaces is formed.

If a plurality of rectangles is arranged in one direction, the type of parking spaces is determined depending on the arrangement.

For example, the plurality of rectangles is arranged in a long-edge direction, a plurality of parking spaces is parallel parking spaces.

For example, the plurality of rectangles is arranged in a short-edge direction, a plurality of parking spaces is perpendicular parking spaces.

For example, the plurality of rectangles is arranged in a tilted manner, a plurality of parking spaces is diagonal parking spaces.

Based on object information, the controller 170 may determine a location of a parking available space existing in surroundings of the vehicle 100. If a plurality of parking available spaces is detected in surroundings of the vehicle 100, the controller 170 may output a menu for selecting one of the plurality of parking available spaces. If a user input for selecting one of the plurality of parking available spaces is received through an input unit, the controller 170 may generate a parking path 20a along which the vehicle 100 enters into a selected parking available space 10a. If the selected parking available space 10a is a diagonal parking space, the parking path 20a along which the vehicle 100 enters into the selected parking available space 10a may be referred to as a diagonal parking path.

As shown in the middle example of FIG. 9, parking spaces may be indicated by a plurality of side parking lines.

When the plurality of side parking lines is arranged in one direction, a plurality of parking spaces is arranged in one direction. The type of parking spaces is determined depending on how much the side parking lines are tilted.

For example, if side parking lines are tilted at a specific angle and the tilted side parking lines are arranged in one direction, a plurality of diagonal parking spaces is formed.

For example, when side parking lines are not tilted but arranged in one direction, a plurality of perpendicular parking spaces is formed.

If it is determined, based on the object information, that a plurality of side parking lines tilted at a specific angle is detected or that a plurality of parked other vehicles tilted at a specific angle, the controller 170 may determine that a plurality of diagonal parking spaces exists. The controller 170 may determine that a parking space in which no other vehicle is parked is a parking available space. Based on a location of the parking available space and a location of the vehicle 100, the controller 170 may select a parking available space 10b which the vehicle 100 can enter by travelling the shortest distance. Based on the object information, the controller 170 may determine a parking path 20b for the vehicle 100 to enter the selected parking available space 10b.

As shown in the bottom-most example of FIG. 9, parking spaces may be indicated by a plurality of side parking lines and a reference line connecting end points of the side parking lines. The type of parking spaces is determined depending on how much the side parking lines are tilted.

For example, when side parking lines are tilted at a specific angle and arranged in one direction, a plurality of diagonal parking spaces is formed.

For example, when side parking lines are not tilted but arranged in one direction, a plurality of perpendicular parking spaces is formed.

When it is determined, based on object information, that a plurality of side parking lines tilted at a specific angle and a reference line connecting end points of the side parking lines are detected or that a plurality of parked other vehicles is tilted at a specific angle, the controller 170 may determine that there is a plurality of diagonal parking spaces. The controller 170 may determine that a parking space in which no vehicle is parked is a parking available space. In the case where there is a plurality of parking available spaces 10c and 10d, the controller 170 may generate a plurality of parking paths 20c and 20d along which the vehicle 100 needs to enter the plurality of parking available spaces 10c and 10d.

To determine whether a parking available space is a diagonal parking space, the controller 170 may detect a reference line. Hereinafter a type of reference line and a detection method will be described with reference to FIG. 10.

Figure 10:
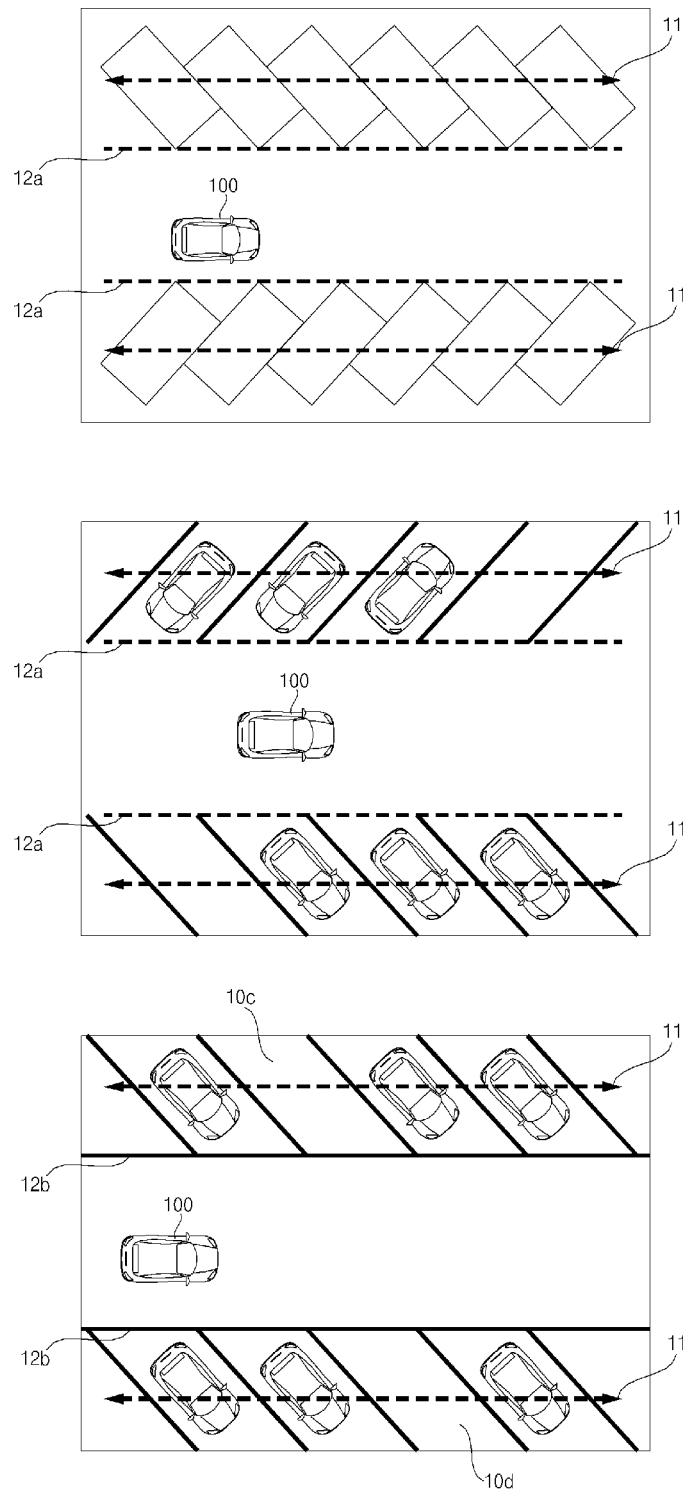
FIG. 10 is a diagram illustrating an example of a reference line determined by a parking assistant system according to an implementation.

FIG. 10 is a diagram illustrating a reference line determined by a parking assistant system according to an implementation.

A diagonal parking space is a parking space tilted at a specific angle. To determine whether a specific parking space is a diagonal parking space, a reference line is required to determine whether the specific parking space is tilted at the specific angle.

The reference line is a line indicating a direction in which a plurality of parking spaces is arranged. If the front-and-back direction of the plurality of parking spaces is tilted relative to a direction in which the plurality of parking space is arranged, the plurality of parking spaces is diagonal parking spaces. If the front-and-back direction of the plurality of parking spaces is the same as a direction in which the plurality of parking space is arranged, the plurality of parking spaces is parallel parking spaces. If the front-and-back direction of the plurality of parking spaces is perpendicular to a direction in which the plurality of parking space is arranged, the plurality of parking spaces is parallel parking spaces. The reference line may be a line painted on the ground, or may be a virtual line generated by the controller 170.

If there is no plurality of parking spaces arranged in one direction, a reference line is a line indicating a direction of a road adjacent to the parking spaces. In this case, if the front-and-back direction of the parking spaces is tilted at a specific angle relative to the direction of the road, rather than being parallel or perpendicular thereto, the parking spaces are diagonal parking spaces.

In the top-most example of FIG. 10, parking spaces are rectangles defined by parking lines. In the case where a plurality of rectangles respectively indicating the parking spaces is arranged in one direction, a reference line is a line connecting end points each located the same position in the respective rectangles.

The controller 170 may generate a reference line based on vertexes of the plurality of parking spaces. In this case, the generated reference line is a virtual line that is not displayed on the ground. A vertex of a parking space is a vertex of a rectangle indicating the corresponding parking space.

Based on an image captured by the camera 310, the controller 170 may detect a rectangle indicating a parking space. If a plurality of rectangles is detected, the controller 170 may detect a vertex of each of the plurality of rectangles. The controller 170 may connect vertexes each having the same position in the respective rectangles from among a plurality of detected vertexes. The controller 170 may determine a straight line 12a connecting the vertexes each having the same position in the respective rectangles is a virtual reference line. If the plurality of rectangles is arranged in one direction, a direction 11 in which the plurality of rectangles is arranged may correspond to a direction of the virtual reference line 12a. In this case, the virtual reference line 12a may indicate the direction 11 in which the plurality of parking spaces is arranged.

In the middle example of FIG. 10, parking spaces are indicated by a plurality of side parking lines. In the case where the plurality of side parking lines respectively indicating parking spaces is arranged in one direction, a reference line 12a is a line 12a connecting end points each having the same position in the respective side parking lines. An end point may be a vertex. An endpoint of a side parking line may be a vertex of a parking space.

The controller 170 may generate the reference line 12a based on end points of the plurality of side parking lines. In this case, the reference line 12a is a virtual line that is not displayed on the ground.

Based on an image captured by the camera, the controller 170 may detect a plurality of side parking lines indicating parking spaces. The controller 170 may detect an end point of each of the plurality of side parking lines. The controller 170 may connect end points each having the same position in the respective side parking lines. The controller 170 may determine that a straight line 12a connecting end points each having the same position in the respective side parking lines is a virtual reference line. If the plurality of side parking lines is arranged in one direction, the direction 11 in which the plurality of side parking lines is arranged may correspond to a direction of the virtual reference line 12a. In this case, the virtual reference line 12a may indicate the direction 11 in which the plurality of parking spaces is arranged.

In the bottom-most example of FIG. 10, parking spaces are indicated by a plurality of side parking lines and an actual reference line 12b. The actual reference line 12b is a reference line painted on the ground. The actual reference line 12b is a line connecting end points of the plurality of side parking lines.

Based on an image captured by the camera 310, the controller 170 may detect a reference line 12b formed in a direction in which a plurality of parking spaces is arranged. The actual reference line 12b may indicate the direction 11 in which the plurality of parking spaces is arranged.

Based on a reference line and a side parking line of a parking available space, the controller 170 may determine whether the parking available space is a diagonal parking space. In addition, based on a reference line and an overall length direction of an other vehicle parked beside a parking available space, the controller 170 may determine whether the parking available space is a diagonal parking space. Hereinafter, a method by which the controller 170 determines whether a parking available space is a diagonal parking space will be described with reference to FIG. 11.

Figure 11:
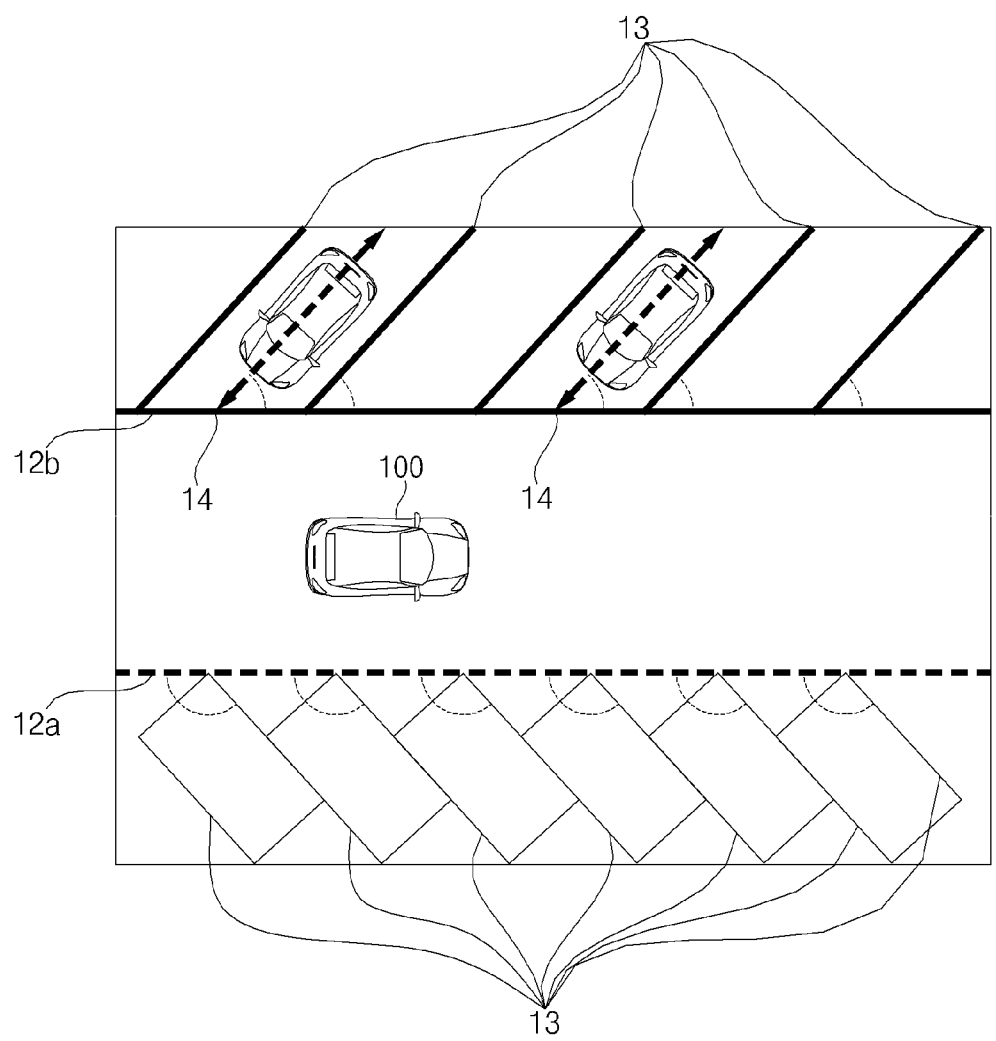
FIG. 11 is a diagram illustrating an example of a parking assistance system detecting a diagonal parking space.

FIG. 11 is a diagram illustrating a method by which a parking assistant system according to an implementation detects a diagonal parking space.

Based on object information, the controller 170 may determine that a rectangular parking space defined with parking lines exists on the right side of the vehicle 100.

The controller 170 may determine a reference line 12a based on vertexes of a plurality of parking spaces. A vertex of a parking space is a vertex of a rectangle indicating a parking space.

The controller 170 may detect vertexes of a plurality of rectangles indicating the plurality of parking spaces. The controller 170 may connect vertexes each having the same position in the respective rectangles to form a straight line 12a. The controller 170 may generate a virtual reference line 12a connecting the vertexes of the respective rectangles.

Based on object information, the controller 170 may detect a side parking line 13 of a parking available space. In this case, the object information may be image information about the surroundings of the vehicle 100, the information acquired through the camera 310. The side parking line 13 is a parking line corresponding to a long edge of a rectangle indicating a parking space.

Based on the object information, the controller 170 may calculate an angle between the side parking line 13 of the parking available space and the reference line 12a. Based on the angle between the side parking line 13 of the parking available space and the reference line 12a, the controller 170 may determine a type of the parking available space.

If the angle between the side parking line 13 of the parking available space and the reference line 12a is an acute or obtuse angle, the controller 170 may determine that the parking available space is a diagonal parking space. If the angle between the side parking line 13 of the parking available space and the reference line 12a is an acute or obtuse angle, the parking available space is tilted at a specific angle relative to the reference line 12a.

In addition, if the angle between the side parking line 13 of the parking available space and the reference line 12a is exactly or almost 0 degree, the controller 170 may determine that the parking available space is a parallel parking space. If the angle between the side parking line 13 of the parking available space and the reference line 12a is exactly or almost 90 degrees, the controller 170 may determine that the parking available space is a perpendicular parking space.

If a parking space is indicated by a side parking line and a reference line, the controller 170 may detect an actual reference line 12b painted on the ground and a side parking line 13, based on object information. When the actual reference line 12b is detected, the controller 170 may calculate an angle between the side parking line 13 of a parking available space and the actual reference line 12b. The controller 170 may determine a type of the parking available space based on an angle between the side parking line 13 of the parking available space and the actual reference line 12b. If it is determined that the angle between the side parking line 13 of the parking available space and the actual reference line 12b is an acute or obtuse angle, the controller 170 may determine that the parking available space is a diagonal parking space.

If a different vehicle is parked beside the parking available space, the controller 170 may determine, based on an overall length direction 14 of the different vehicle and the reference line 12b, whether the parking available space is a diagonal parking space. Based on object information, the controller 170 may determine whether a different vehicle is parked beside the parking available space. Based on the object information, the controller 170 may determine the overall length direction 14 of the different vehicle parked beside the parking available space. In this case, the object information may be image information acquired through the camera 310, or information on a location, a size, and a shape of an object sensed by another sensor. The overall length direction 14 of the different vehicle is the front-and-back direction thereof.

The controller 170 may determine an angle between the overall length direction 14 of the different vehicle parked beside the parking available space and the reference line 12b. If the angle between the overall length direction 14 of the different vehicle and the reference line 12b is an acute or obtuse angle, the controller 170 may determine that the parking available space existing beside the different vehicle is a diagonal parking space. Adjacent parking spaces are the same type, and thus, if a different vehicle is parked in a parking space adjacent to a parking available space, the controller 170 may determine a type of the parking available space based on a state of the different vehicle.

The object detection apparatus 300 may include a side sensor configured to detect an object located on a side of the vehicle 100, and a diagonal sensor configured to detect an object located in a diagonal direction of the vehicle 100. The side sensor or the diagonal sensor may be any sensor capable of detecting an object of predetermined volume, and has no other limitation. For example, the side sensor or the diagonal sensor may be any one of a radar, a lidar, an ultrasonic sensor, and an infrared sensor.

The side sensor is disposed on the right or left side of the vehicle 100. As the side sensor detects an object in front thereof and is arranged on the right or left side of the vehicle 100, the controller 170 is able to detect an object located on the right or left side of the vehicle 100 by using the side sensor.

The diagonal sensor is disposed in a diagonal direction of the vehicle 100. The diagonal direction may be at least one of a right forward direction, a right backward direction, a left forward direction, or a left backward direction. As the diagonal sensor detects an object in front thereof and is arranged in a diagonal direction of the vehicle 10, the controller 170 is able to detect an object located in a diagonal direction of the vehicle 100.

Based on the object information, the controller 170 may determine whether a different vehicle is parked beside a parking available space. If it is determined that the different vehicle is parked beside the parking available space, the controller 170 may determine, based on information acquired by the diagonal sensor and the side sensor, whether the parking available space next to the different vehicle is a diagonal parking space.

Based on the information acquired by the diagonal sensor and the side sensor, the controller 170 may determine whether there is an area which is not sensed by the side sensor but sensed by the diagonal sensor due to the presence of the different vehicle. If there is an area which is not sensed by the side sensor but sensed by the diagonal sensor due to the presence of the different vehicle, the controller 170 may determine that the parking available space next to the different vehicle is a diagonal parking space.

Using the diagonal sensor and the side sensor, the controller 170 may determine a shape of a parking space beside the different vehicle. The controller 170 may determine whether a shape of a parking space sensed by the diagonal sensor is identical to a shape of a parking space sensed by the side sensor. If it is determined that the shape of a parking space sensed by the diagonal sensor is identical to the shape of a parking space sensed by the side sensor, the controller 170 may determine that the parking space is a perpendicular or parallel parking space. In this case, there is no area which is not sensed by the side sensor but sensed by the diagonal sensor, and thus, the parking space is not a diagonal parking space.

Figure 12:
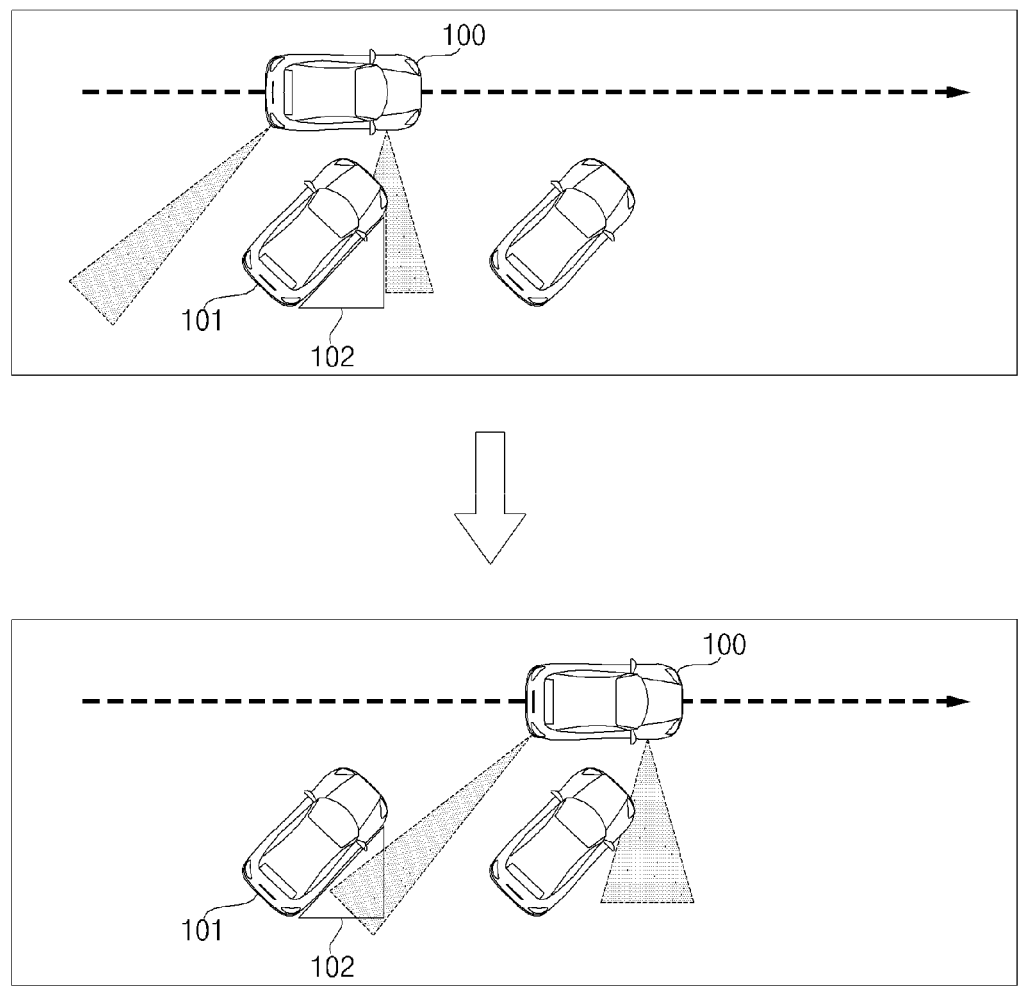
FIG. 12 is a diagram illustrating an example of a parking assistance system determining, by use of a sensor, whether a parking available space is a diagonal parking space.

FIG. 12 is a diagram illustrating how a parking assistant system according to an implementation determines, by use of a sensor, whether a parking available space is a diagonal parking space.

In the example of FIG. 12, a diagonal sensor is disposed in a lateral backward direction of the vehicle 100. In contrary, the diagonal sensor may be disposed in a lateral forward direction of the vehicle 100.

In the example of FIG. 12, a side sensor is disposed before the diagonal sensor in the vehicle 100. However, there is no limitation in the respective locations of the side sensor and the diagonal sensor. In contrary, the side sensor and the diagonal sensor may be at the same location.

To search for a parking available space, the controller 170 may control the vehicle 100 to travel straight forward at a set speed. The controller 170 may control the vehicle 100 by transmitting a control signal to the vehicle drive apparatus 600.

In the case of controlling the vehicle 100 to travel straight forward, in order to search for a parking available space, the controller 170 may control the vehicle 100 to travel in a direction of a reference line. If no parking line is detected from the ground, the controller 170 may determine, based on object information, a direction in which other vehicles 101 parked in one direction are arranged. In this case, based on the direction in which the parked other vehicles 101 are arranged, the controller 170 may generate a virtual straight line. The controller 170 may determine that a virtual straight line formed in the direction of arrangement of the parked other vehicles 101 is a reference line.

In contrary, if it is determined, based on object information, that a traffic line indicating a traffic lane exists on the ground, the controller 170 may determine that the traffic line indicating the traffic lane is a reference line. In this case, if an angle between the traffic line indicating a traffic lane and the overall length direction of the different vehicle 101 is an acute or obtuse angle, the controller 170 may determine that a parking space beside the other vehicle 101 is a diagonal parking space. In this case, to search for a parking available space, the controller 170 moves the vehicle 100 along a direction of the traffic lane. A direction of a traffic lane is a direction in which the traffic lane elongates, and in which vehicles are required to move within the traffic lane according to laws.

While the vehicle 100 is travelling, the controller 170 may determine a type of parking space based on space information detected by the side sensor and the diagonal sensor.

In the case where the vehicle 100 passes beside a different vehicle 101 parked on the right side of the vehicle 100, the controller 170 may detect the different vehicle 101 using a side sensor located on the right side of the vehicle 100.

As the vehicle 100 travels straight forward in a direction of the reference line and the different vehicle 101 is parked in a diagonal direction, an angle between the overall length direction of the vehicle 100 and the overall length direction of the different vehicle 101 is an acute or obtuse angle. As a direction in which the side sensor detects an object is perpendicular to the overall length direction of the vehicle 100, an angle between the overall length direction of the different vehicle 101 and the direction for detection of the side sensor is an acute or obtuse angle.

In the example of FIG. 12, the angle between the overall length direction of the vehicle 101 and the direction for detection of the side sensor is an acute or obtuse angle, and thus, there is an area 102 which is not sensed by the side sensor due to the presence of the vehicle 101.

As the vehicle 100 travels straight forward, the controller 170 may detect the vehicle 101 using the diagonal sensor. As a direction for detection of the diagonal sensor disposed in the right backward direction corresponds to the overall length direction of the vehicle 101, the area 102 not sensed by the side sensor may be sensed by the diagonal sensor. By comparing the shape of space sensed by the side sensor and the shape of a space sensed by the diagonal sensor, the controller 170 may determine whether there is an area 102 which is not sensed by the side sensor but sensed by the diagonal sensor. If the area 102 not sensed by the side sensor but sensed by the diagonal sensor exists beside the different vehicle 101, the controller 170 may determine that the blind spot 102 is created due to the different vehicle 101.

If it is determined that the area 102 not sensed by the side sensor but sensed by the diagonal sensor exists beside the different vehicle 101, the controller 170 may determine that the different vehicle 101 is parked in a diagonal direction. In this case, the controller 170 may determine that a parking available space next to the diagonally parked different vehicle 101 is a diagonal parking space.

If the vehicle 101 is parked in a perpendicular or parallel direction, there is no area 102 which is not sensed by the side sensor but sensed by the diagonal sensor. If it is determined that there is no area 102 which is not sensed by the side sensor but sensed by the diagonal sensor, the controller 170 may determine that the vehicle 101 is parked in a perpendicular or parallel direction.

If the diagonal sensor is disposed in a lateral rear-side direction of the vehicle 100, the controller 170 may determine whether there is a diagonal parking space into which the vehicle 100 can enter by a reverse parking maneuver.

If the diagonal sensor is disposed in a front-side direction of the vehicle, the controller 170 may determine whether there is a diagonal parking space which the vehicle 100 can enter by performing a front parking maneuver.

According to an implementation, there may be one or more parking available spaces. Based on object information, the controller 170 may determine one or more parking available spaces. Based on the object information, the controller 170 may determine whether the determined one or more parking available spaces are diagonal parking spaces. If it is determined that the one or more parking available spaces are diagonal parking spaces, the controller 170 may generate one or more paths along which the vehicle 100 moves to enter the one or more parking available spaces. Accordingly, there may be a plurality of parking available spaces and even a plurality of diagonal parking paths.

If it is determined that there is a plurality of parking available spaces determined to be diagonal parking spaces and that there is a plurality of diagonal parking paths, the controller 170 may display a menu screen on the display unit

251 to select one of the plurality of parking available spaces and one of the diagonal parking paths. Based on a user input received through the input unit 210, the controller 170 may select one of the plurality of parking available spaces and one of the diagonal parking paths.

Based on vehicle driving information, the controller 170 may select one of the plurality of parking available spaces and one of the diagonal parking paths. For example, based on the vehicle driving information, the controller 170 may determine a space at the shortest distance from the vehicle 100, a space with the lowest parking difficulty, a space with the shortest parking time, or a space having the least probability of collision with an object among the plurality of parking available spaces, and then the controller 170 may select one parking available space.

In the case where there is a single parking available space, there may be a plurality of parking paths for the vehicle 100 to enter the parking available space. Based on vehicle driving information, the controller 170 may determine that there is a plurality of parking paths to enter the parking available space. If it is determined that there is a plurality of parking paths to enter the parking available space, the controller 170 may display a menu screen on the display 251 to select one of the plurality of parking paths. Based on a user input or the vehicle driving information, the controller 170 may select one of the plurality of parking paths. Based on the vehicle driving information, the controller 170 may select a shortest path, a shortest parking path, a parking path with the lowest parking difficulty, and a parking path with the shortest parking time from the plurality of parking paths.

In the case where there is a plurality of parking paths, the controller 170 may select, based on a user input or vehicle driving information, one of the plurality of parking paths. Based on the selected parking path, the controller 170 may adjust the scale of an Around View Monitor (AVM) displayed on the display unit 251 while parking the vehicle 100. Detailed description thereof will be provided with reference to FIG. 13B.

Figure 13A:
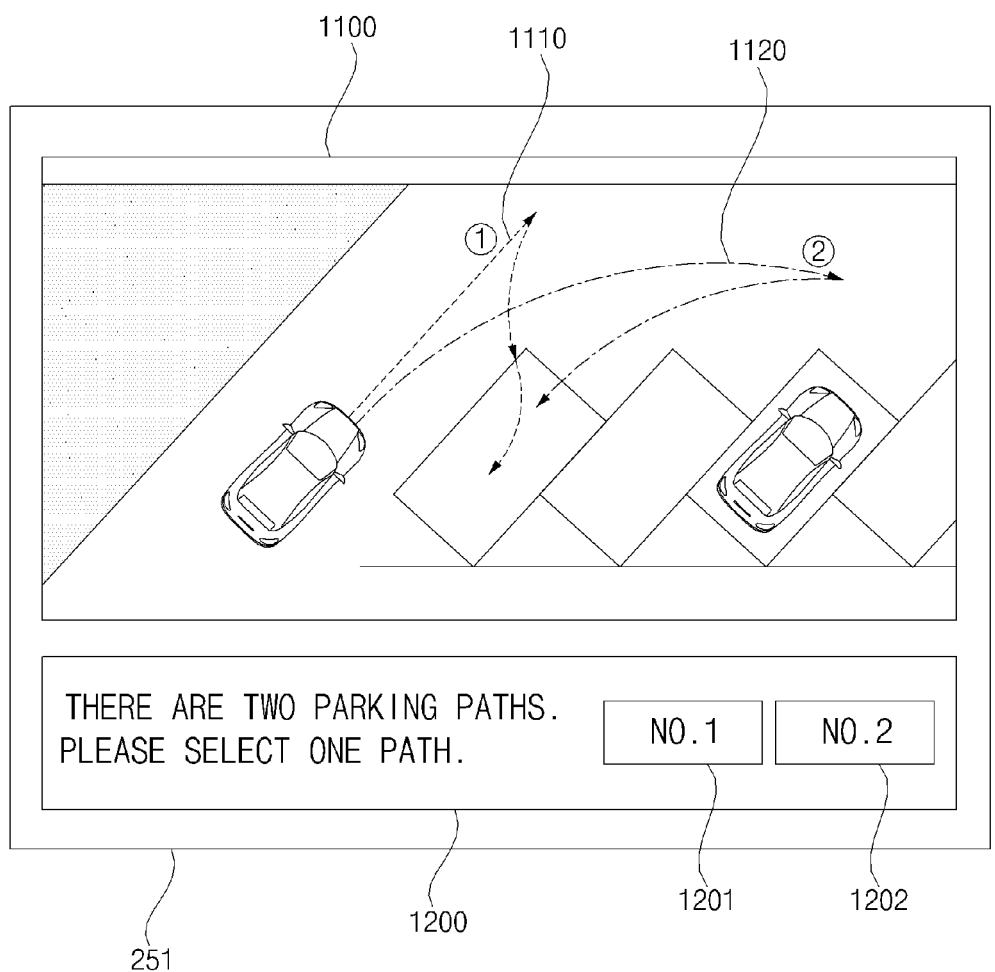
FIGS. 13A and 13B are diagrams illustrating examples of a user interface provided in a parking assistance system in scenarios where a plurality of parking paths are determined.
Figure 13B:
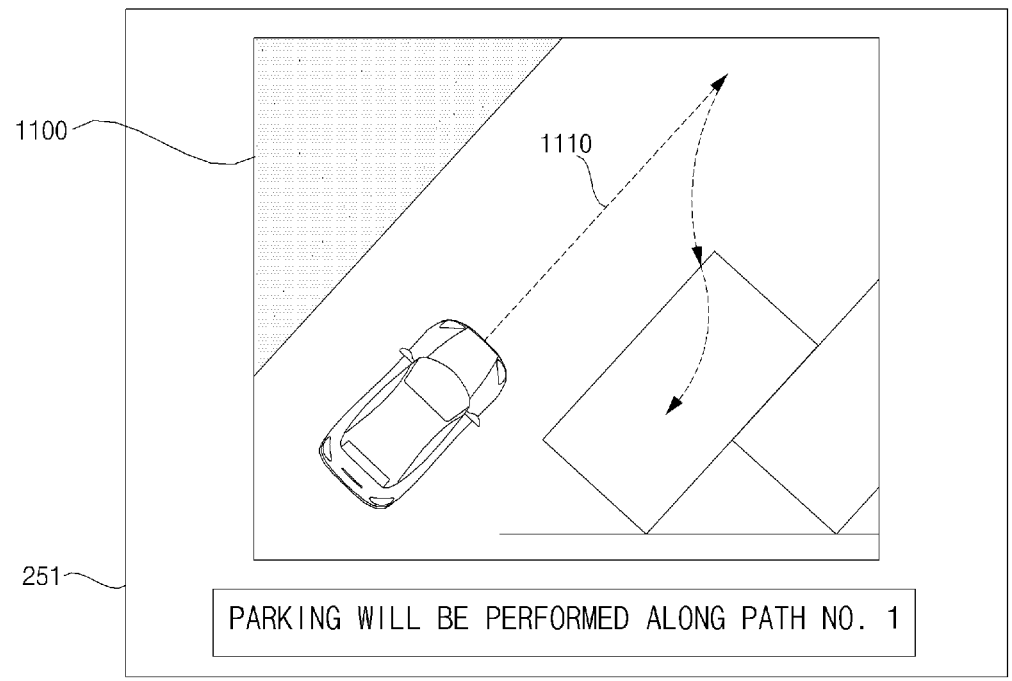
Figure 13B:
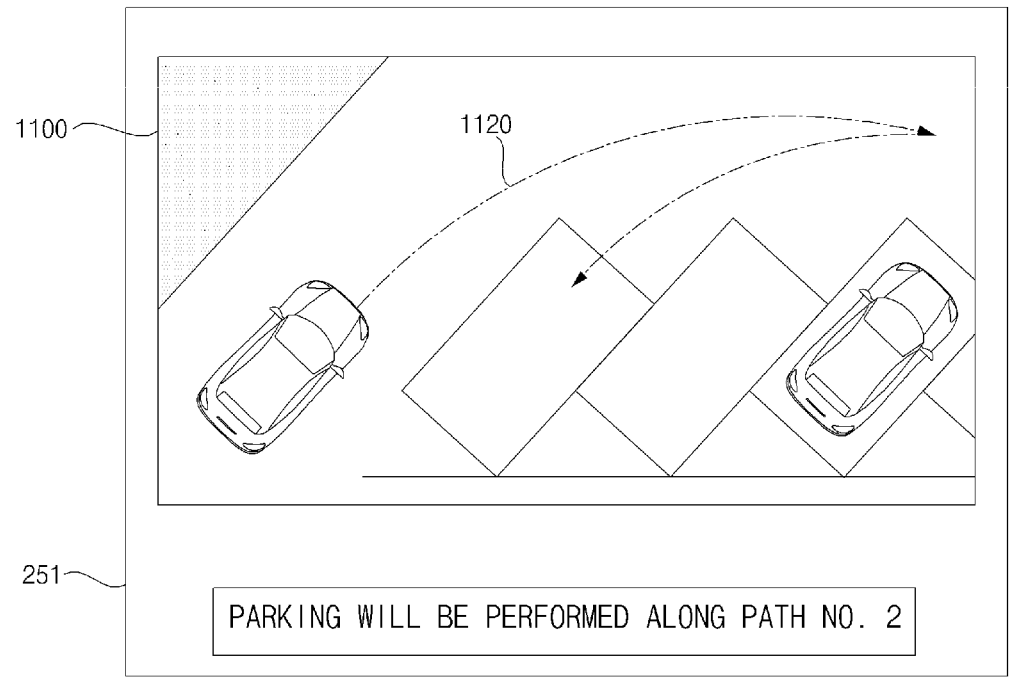

FIGS. 13A and 13B are diagram illustrating a user interface that is provided a parking assistant system according to an implementation when there is a plurality of parking paths.

When there is a plurality of parking available spaces, the controller 170 may select one of the plurality of parking available spaces based on a user input.

When one parking available space is selected, the controller 170 may determine, based on object information, whether there is a plurality of parking paths for the vehicle 100 to enter the selected parking available space.

Referring to FIG. 13A, when it is determined there is a plurality of parking paths for the vehicle 100 to enter the selected parking available space, the controller 170 may display an AVM screen 1100 and a menu screen 1200 on the display unit 251, wherein the AVM screen 1100 shows the plurality of parking paths and the menu screen 1200 enables a user to select one of the plurality of parking paths.

When it is determined that there are two parking paths for the vehicle to enter the parking available space, the controller 170 may display both a first parking path and a second parking path on the AVM screen 1100.

The controller 170 may display, on the menu screen 1200, a button 1201 for selecting the first parking path and a button 1202 for selecting the second path. The controller 170 may display, on the menu screen 1200, a path selection guide text. Based on a user input on the button 1201 for selecting the first parking path or the second button 1202 for selecting the second parking path, the controller 170 may select one of the plurality of parking paths.

When one of the plurality of parking paths is selected, the controller 170 may adjust the scale of the AVM screen 1100 displayed on the display unit 251 of the vehicle 100 based on how large region is occupied by the selected parking path. A region occupied by a parking path indicates an area defined by a boundary that is generated by straightly connecting a start point and an end point of a parking path displayed on the AVM screen 1100. The controller 170 may adjust the scale of the AVM screen 1100 so that the region occupied by the selected parking path is entirely displayed on the AVM screen 1100. Accordingly, a user is able to see the whole parking path on the AVM screen 1100 without moving his/her perspective.

Referring to upper example in FIG. 13B, the controller 170 selects the first parking path 1110 upon receipt of a user input on the button 1201 for selecting the first parking path 1110.

When the first parking path 1110 is selected, the controller 170 adjusts the scale of the AVM screen 1100 so that the first parking path 1110 is entirely displayed on the AVM screen 1100.

The controller 170 displays the first path 1110 on the AVM screen 1100, and, if the vehicle 100 moves, the controller 170 controls an image of the vehicle displayed on the AVM screen 1100 to move as well.

Referring to the lower example in FIG. 13B, the controller 170 selects the second parking path 1120 upon receipt of a user input on the button 1202 for selecting the second parking path 1120.

When the second parking path 1120 is selected, the controller 170 may adjust the scale of the AVM screen 1100 so that the second path 1120 is entirely displayed on the AVM screen 1100.

The controller 170 displays the second path 1120 on the AVM screen 1100, and, if the vehicle 100 moves, the controller 170 controls an image of the vehicle displayed on the AVM screen 1100 to move as well.

Since the region occupied by the first parking path 1110 is smaller than the region occupied by the second parking path 1120, the scale of the AVM screen 1100 which displays the first parking path 1110 is smaller than the scale of the AVM screen 1100 which displays the second parking path 1120.

When there is a plurality of parking spaces including a parking available space and arranged in one direction, the controller 170 may generate a diagonal parking path based on a location of the parking available space, a side parking line, a reference lane, and a location of the vehicle 100.

The reference lane is, in some implementations, a lane that is formed along a direction in which the plurality of parking spaces are arranged, and which is adjacent to the plurality of parking spaces. For example, the reference lane may be a lane that is designated by lines marked on the ground, or may be a virtual lane generated by the controller 170.

A direction of the reference lane is a fixed direction of travel that is associated with the reference lane. For example, the direction of the reference lane may be a direction of travel that is established according to traffic laws or traffic rules. Thus, even if the vehicle 100 travels in a direction opposite to a direction designated by the reference lane, the direction of the reference lane is nonetheless the direction that is designated for, or associated with, the reference lane.

The controller 170 may generate a diagonal parking path based on a location of the parking available space, an overall length direction of a vehicle parked beside the parking available space, the reference lane, and a location of the vehicle 100.

The controller 170 may select either a reverse parking maneuver or a forward parking maneuver based on an angle between a side parking line of the parking available space and the reference lane. Based on the selected parking maneuver, the controller 170 may generate a diagonal parking path.

Figure 14:
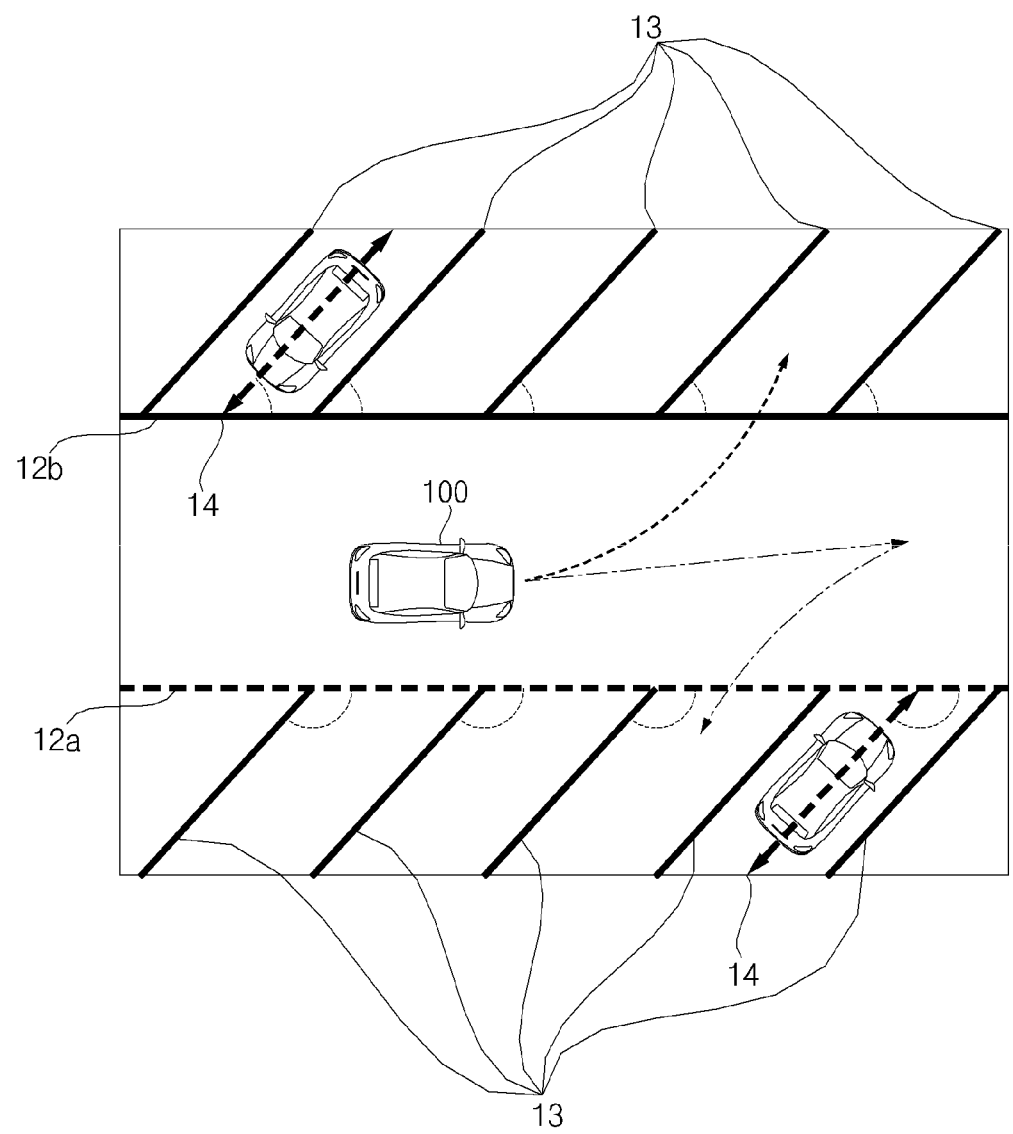
FIG. 14 is a diagram illustrating an example of a parking assistance system selecting either a reverse parking maneuver or a forward parking maneuver.

FIG. 14 is a diagram illustrating how a parking assistant system according to an implementation selects either a reverse parking maneuver or a forward parking maneuver.

When the angle between a side parking line of the parking available space and the reference lane is an acute angle, the controller 170 selects the forward parking maneuver. When the angle between a side parking line of the parking available space and the reference lane is an obtuse angle, the controller 170 selects a reverse parking maneuver.

In the example of FIG. 14, a direction of the reference lane is assumed to be a left-to-right direction.

The direction of the reference lane may correspond to a direction of reference lines 12*a* and 12*b*.

The controller 170 may generate the reference line 12*a* which is a virtual straight line connecting end points of side parking lines 13 each indicating a parking available space. When the angle between a side parking line 13 of a parking available space on the right side of the vehicle 100 and the reference line 12*a* is an acute or obtuse angle, the controller 170 may determine that the parking available space is a diagonal parking space.

When a plurality of parking available spaces existing on the right side of the vehicle 100 is determined to be diagonal parking spaces, the controller 170 may select a parking available space for the vehicle 100 to enter based on vehicle driving information or a user input. In the example of FIG. 14, it is assumed that one parking available space is selected based on a user input.

Based on a side parking line 13 of the parking available space and a reference lane, the controller 170 determines whether the vehicle 100 needs to perform a forward parking maneuver or a reverse parking maneuver. The controller 170 calculates an angle between the side parking line 13 and the reference lane based on a direction of the reference lane.

As the direction of the reference lane is to right in the example of FIG. 14, the controller 170 determine an angle of the side parking line 13 relative to a direction to the right side of the reference lane. In this case, an angle between the side parking line 13 and the reference lane is an obtuse angle. As the angle between the side parking line 13 and the reference lane is an obtuse angle, the controller 170 determines that the vehicle 100 needs to perform a reverse parking maneuver. Accordingly, the controller 170 generates a parking path, along which the vehicle 100 can travel straight forward beside the selected parking available space and then reverse in the parking available space.

When there is other vehicle parked beside the parking available space, the controller 170 may select one of parking maneuvers based on an overall length direction 14 of the other vehicle and the reference lane. If an angle between a line formed in the overall length direction 14 of the other vehicle and the reference lane is an acute angle, the controller 170 may select a forward parking maneuver. If the angle between the line formed in the overall length direction 14 of the other vehicle and the reference lane is an obtuse angle, the controller 170 may select a reverse parking maneuver.

If it is determined, based on object information, there is a different vehicle parked beside the parking available space, the controller 170 may determine the overall length direction 14 of the different vehicle. Considering that a direction of the reference lane is to right, the controller 170 may determine an angle between a line formed in the overall length direction 14 of the different vehicle and the reference lane. As the angle between the line formed in the overall length direction 14 of the different vehicle and the reference lane is an obtuse angle, the controller 170 may determine that the vehicle 100 needs to perform a reverse parking maneuver to be parked in the parking available space. The controller 170 may generate a diagonal parking path based on the reverse parking maneuver.

Based on object information, the controller 170 may detect a side parking line 13 on the left side of the vehicle 100, and a plurality of parking available spaces indicated by an actual reference line 12*b*. A direction of a reference lane may correspond to a direction of the actual reference line 12*b*. As the direction of the reference lane is to right, the controller 170 may determine that an angle between the side parking line 13 and the reference lane is an acute angle. As the angle between the side parking line 13 and the reference lane is an acute angle, the controller 170 may select a forward parking maneuver that the vehicle 100 needs to perform. The controller 170 may generate a diagonal parking path corresponding to the forward parking maneuver. The diagonal parking path corresponding to the forward parking maneuver is a path along which the vehicle 100 can enter a parking available space without reversing.

Figure 15:
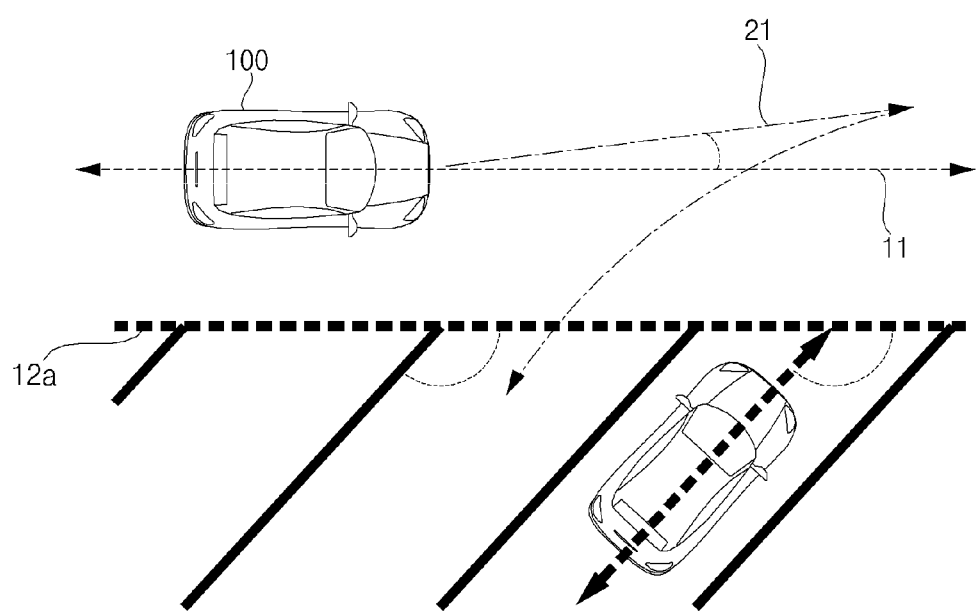
FIG. 15 is a diagram illustrating an example of a reverse diagonal parking path generated by a parking assistant system according to an implementation.

FIG. 15 is a diagram illustrating a reverse diagonal parking path generated by a parking assistant system according to an implementation.

When a diagonal parking path is generated, the controller 170 may generate the diagonal parking path, wherein the diagonal parking path has a set range of an angle that is formed between a direction of the reference lane 11 and a driving direction 21 in which the vehicle 100 travels straight forward in the reference lane with passing beside the parking available space.

Accordingly, when the vehicle 100 moves along the diagonal parking path, the angle between the direction 11 of the reference lane and the driving direction 21 may fall within the set range. The set range is determined through experiments, and desirably as small as possible. For example, the set range may be 0 to 6 degrees.

In the case where the vehicle 100 travels straight forward in the reference lane, parking accuracy may be improved if a driving direction of the vehicle and a direction of the reference lane form a small angle. To this end, the controller 170 may generate a diagonal parking path so that the angle between the driving direction in which the vehicle 100 travels straight forward in the reference lane and the direction of the reference lane falls within the set range.

Figure 16:
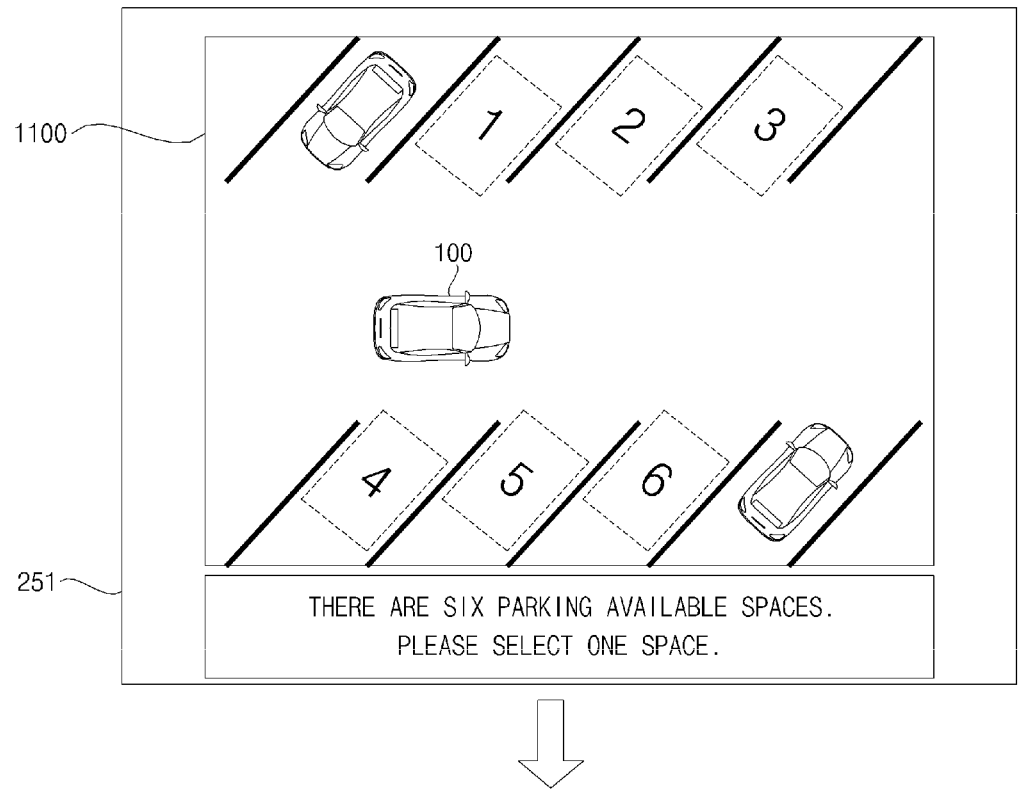
FIG. 16 is a diagram illustrating an example of a user interface provided by a parking assistance system in scenarios where a plurality of diagonal parking spaces are detected.
Figure 16:
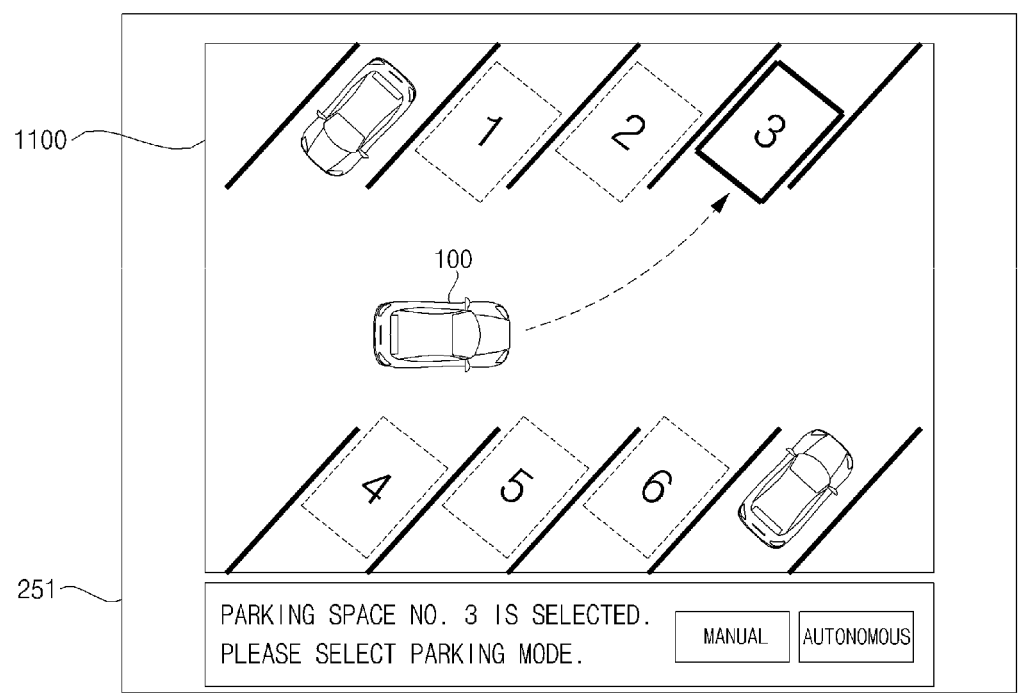

FIG. 16 is a diagram illustrating a user interface provided by a parking assistant system according to an implementation when there is a plurality of diagonal parking spaces.

When there is a plurality of parking available spaces determined to be diagonal parking spaces, the controller 170 may select one of the plurality of parking available spaces based on a user input.

Based on object information, the controller 170 may determine whether there is a plurality of parking available spaces determined to be diagonal parking spaces. If there is a plurality of parking available spaces determined to be diagonal parking spaces, the controller 170 may display a menu screen on the display unit 251 to select one of the plurality of parking available spaces.

The menu screen may be an AVM screen 1100 which shows a vehicle and a plurality of parking available spaces. In the menu screen, images respectively indicating the plurality of parking available spaces may be displayed. The images respectively indicating the plurality of parking available spaces may include different numbers, respectively. Accordingly, a user is able to select one of the plurality of parking available spaces.

The controller 170 may select one of the plurality of parking available spaces based on a user input that is touching one of the plurality of parking available spaces displayed on the menu screen.

The controller 170 may generate a diagonal parking path for the vehicle 100 to enter the selected parking available space. The controller 170 may generate the diagonal parking path based on a location of the vehicle 100 and a location and a tilting angle of the selected parking available space. The controller 170 may display an arrow image indicating the generated diagonal parking path on the AVM screen 1100.

The controller 170 may output a menu to the output unit 250 of the vehicle 100 to select a manual parking mode or an autonomous parking mode. This menu may include a button for selecting the manual parking mode and a button for selecting the autonomous parking mode.

The controller 170 may select the manual parking mode or the autonomous parking mode based on a user input corresponding to the output menu.

When the autonomous parking mode is selected, the controller 170 may control the vehicle 100 to be parked along the diagonal parking path. The controller 170 may move the vehicle 100 by transmitting a control signal to the vehicle drive apparatus 600.

When the manual parking mode is selected, the controller 170 may output parking guide information to the output unit 250 to guide the diagonal parking path.

The parking guide information may include at least one of an arrow indicating the diagonal parking path, an image indicating the parking available space, and manipulation needed to be performed by a driver.

The parking guide information may be displayed in various ways. For example, the parking guide information may be the AVM screen of 1100 displayed on the display unit 251. In this case, an arrow corresponding to the diagonal parking path may be displayed on the AVM screen 1100. For example, the parking guide information may be implemented in the form of Augmented Reality (AR) on a transparent display, such as a windshield or a window.

The parking guide information may include sound output to the sound output unit 250. In this case, the parking guide information may be guide voice for guiding the diagonal parking path.

The controller 170 may change parking guide information displayed on the display unit 251, based on a driving direction and a location of the vehicle 100. For example, the vehicle 100 moves out of the diagonal parking path, the controller 170 may output an image indicating manipulation required for the driver to perform in order to return to the diagonal parking path.

Figure 17:
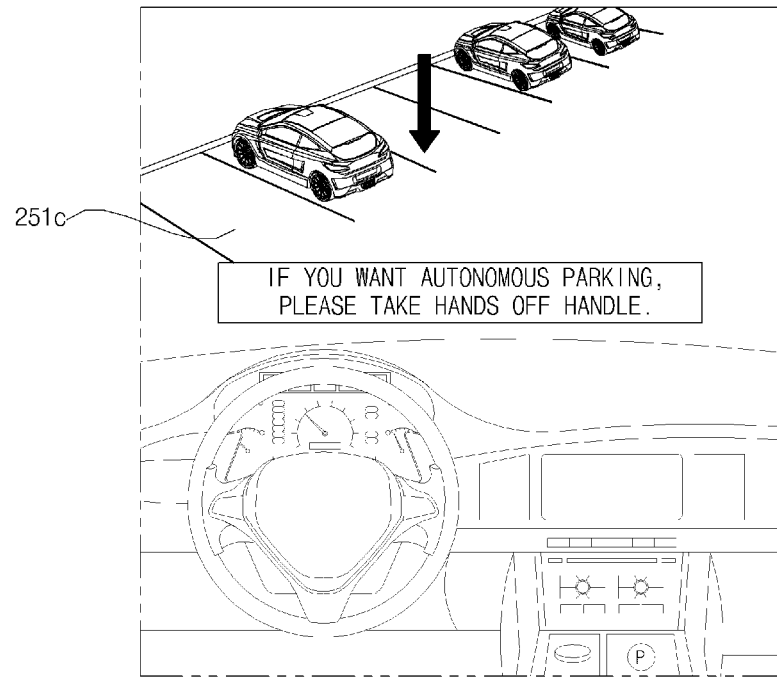
FIG. 17 is a diagram illustrating an example of a user interface provided by a parking assistance system to perform autonomous parking.
Figure 17:
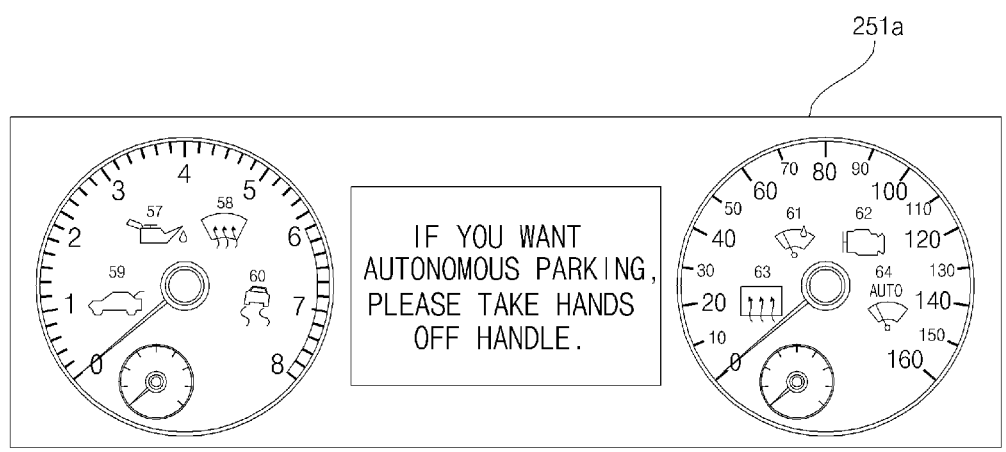

FIG. 17 is a diagram illustrating a user interface provided by a parking assistant system according to an implementation in order to perform autonomous parking.

When a diagonal parking path is generated, the controller 170 may display, on the display unit 251, a text for guiding a user about how to select autonomous parking.

For example, the controller 170 may output, to the display unit 251, a guide text indicating that autonomous parking will start upon hand-off from the handle. For example, the controller 170 may output a text indicating that autonomous parking will start upon pressing of a specific button.

The controller 170 may select the autonomous parking mode based on a user's preset behavior or preset input.

For example, when it is determined that a driver of the vehicle 100 takes his/her hands off the steering wheel, the controller 170 may select the autonomous parking mode. To this end, an additional sensor may be disposed on the steering wheel. The sensor disposed on the steering wheel may sense contact of an object on the steering wheel. Based on detection information acquired by the sensor disposed on the steering wheel, the controller 170 may determine whether or not the driver put his/her hands on the steering wheel.

Referring to the upper example of FIG. 17, the controller 170 may output a text to the transparent display 251c provided in the windshield to guide how to select autonomous parking. The controller 170 may display a selected parking available space in the form of AR.

Referring to the lower example of FIG. 17, the controller 170 may output a text to the display 251a provided in the cluster of the vehicle 100 to guide how to select autonomous parking.

If it is determined that a driver of the vehicle 100 puts his/her hands off the steering wheel, the controller 170 may select the autonomous parking mode. When the autonomous parking mode is selected, the controller 170 may control the vehicle 100 to move along the diagonal parking path.

Figure 18A:
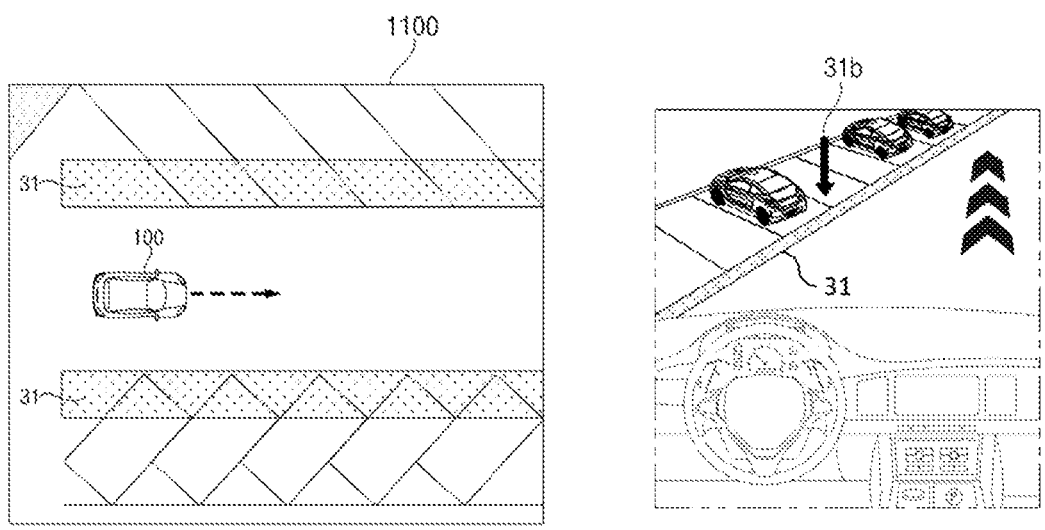
FIGS. 18A, 18B, and 19 are diagrams illustrating examples of guide information output by a parking assistance system that notify a user of a predicted parking space.
Figure 18B:
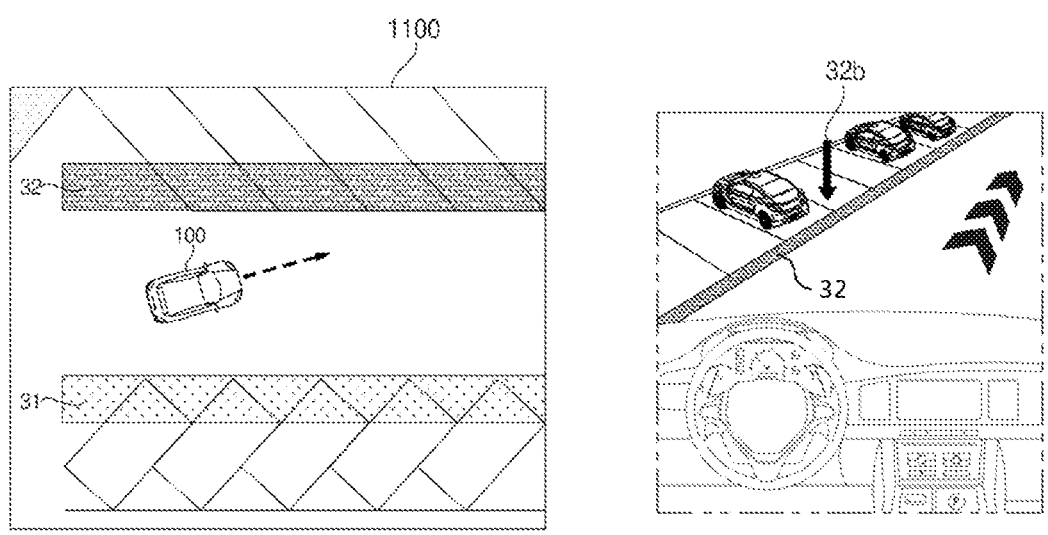
Figure 19:
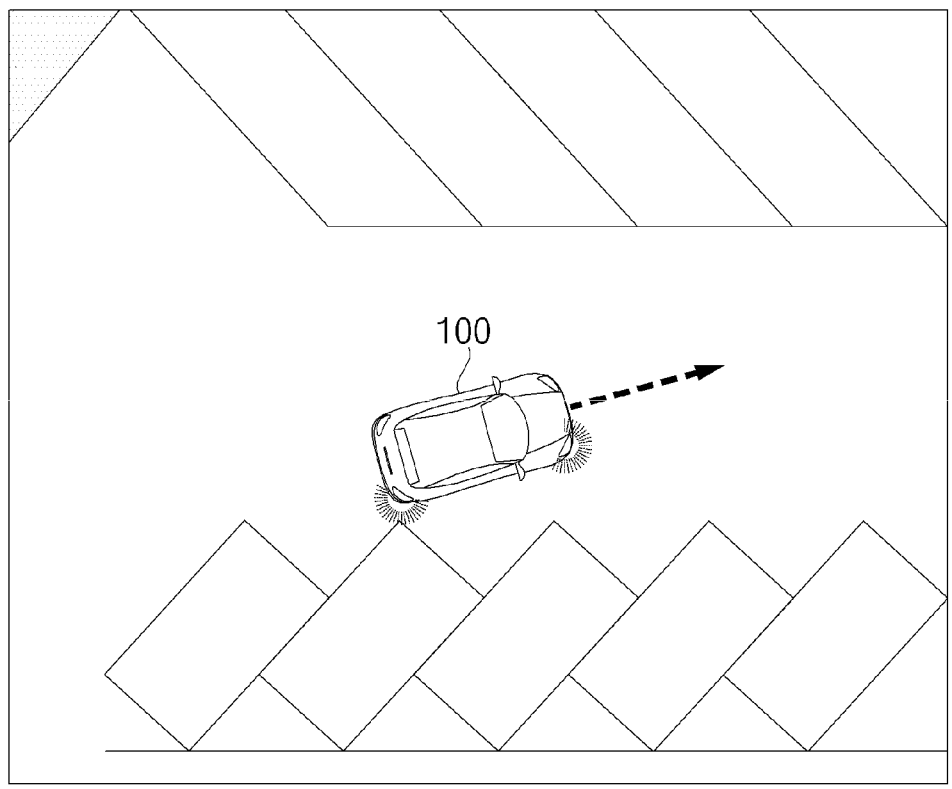

FIGS. 18A, 18B, and 19 are diagrams illustrating guide information output by the parking assistant system according to an implementation in order to notify a predicted parking space.

Referring to FIGS. 18A and 18B, when the vehicle 100 is located in a reference lane and a plurality of parking available spaces determined to be diagonal parking spaces exists on both sides of the reference lane, the controller 170 may determine at least one predicted parking space, based on locations and a tilt direction of the plurality of parking available spaces and a location and a driving direction of the vehicle 100. The controller 170 may output, to the output unit 250 of the vehicle 100, an image 31 indicating at least one predicted parking space.

Based on object information, the controller 170 may determine whether the vehicle 100 is located in the reference lane and whether a plurality of parking available spaces determined to be diagonal parking spaces exists on both sides of the reference lane.

A predicted parking space is one of the plurality of parking available spaces, in which the vehicle 100 is expected to be parked. The controller 170 may determine at least one predicted parking space, based on locations and a tilt direction of the plurality of parking available spaces and a location and a driving direction of the vehicle 100.

In the example of FIG. 18A, the vehicle 100 is located in a reference lane, a driving direction of the vehicle 100 corresponds to a direction of a reference line, a plurality of parking available spaces is located in front of the vehicle 100, and a tilt direction of the plurality of parking available spaces is a direction in which the vehicle 10 needs to reverse for parking. In this case, the vehicle 100 is able to be parked in every parking available space without moving into other location or changing the driving direction. Because the vehicle 100 is able to be parked in every parking available space, the plurality of parking spaces may be all considered to be predicted parking spaces.

Based on object information, the controller 170 may determine the aforementioned situation. The controller 170 may determine that every parking available space is a predicted parking space, based on locations and a tilt direction of the plurality of parking available spaces and a location and a driving direction of the vehicle 100. The controller 170 may display, on the display unit 251, an image indicating a predicted parking space. The image 31 may be a figure or line displayed in a part of the expected parking area.

For example, the controller 170 may display, on the AVM screen 110 output to the display unit 251, the image 31 indicating a predicted parking space. In this case, the image indicating a predicted parking space may be a rectangle 31 that covers a part of the predicted parking space.

For example, the controller 170 may display, on a transparent display provided in a windshield, the image indicating a predicted parking space. In this case, the image 31 indicating a predicted parking space may be a line 31 that passes a part of the predicted parking space. If an area selected by a user exists within a parking available space, the controller 170 may display, on the windshield, an image 31b in the form of AR. The controller 170 may display, on the windshield, an arrow that notifies a parking path for the vehicle 100 to enter a parking available space selected by the user.

The controller 170 may output, to the output unit 250, an image indicating parking spaces other than the predicted parking space among the plurality of parking available spaces. The parking spaces other than the predicted parking space among the plurality of parking available spaces may be spaces in which the vehicle 100 is not expected to be parked.

In the example of FIG. 18B, the vehicle 100 is located in a reference lane, a driving direction of the vehicle 100 is tilted at a specific angle to the left, a plurality of parking available spaces is located beside the vehicle 100, and a tilt direction of the plurality of parking available spaces is a direction in which the vehicle 100 needs to reverse to be parked.

In this case, a parking available space on the left side of the vehicle 100 is not a predicted parking space. The parking available space on the left side of the vehicle 100 is a space in which the vehicle 100 needs to enter by performing a reverse parking maneuver. However, if the vehicle 100 is directed toward a parking available space on the left side of the vehicle 100, the vehicle 100 is not able to enter the parking available space on the left side of the vehicle 100 by performing the reverse parking maneuver. In this case, the vehicle 100 is not able to enter a parking available space on the right side of the vehicle 100 by performing the reverse parking maneuver.

Accordingly, only the parking available space on the right side of the vehicle 100 is a predicted parking space.

The controller 170 may determine that only the parking available space on the right side of the vehicle 100 is a predicted parking space, based on respective locations and a tilt direction of the plurality of parking available spaces and a location and a driving direction of the vehicle 100.

An image indicating a predicted parking space out of the plurality of parking available spaces is a first image, and an image indicating parking spaces other than the predicted parking space from among the plurality of parking available spaces is a second image.

For example, the controller 170 may output, to the display unit 251, the AVM screen 1100 which shows the plurality of parking available spaces. The controller 170 may display a second image 32 in one region of a parking available space on the left side of the vehicle 100, and a first image 31 on one region of a parking available space on the right side of the vehicle 100. The first image 31 and the second image 32 may be displayed with different colors. For example, the first image 31 indicating the expected parking available space may be in green, and the second image 32 may be in red.

For example, when a parking available space on the left side of the vehicle 100 is displayed in the windshield, the controller 170 may display the second image 32 in one region of the windshield. When a parking available space selected by a user is located on the left side of the vehicle 100, the controller 170 may display an image indicating the selected parking available space in red. The controller 170 may display, in the windshield, an arrow that notifies a parking path for the vehicle to enter the selected parking available space.

Referring to FIG. 19, the controller 170 may turn on a turn signal light corresponding to a direction in which a predicted parking space is located, based on locations and a tilt direction of the plurality of parking available spaces and a location and a driving direction of the vehicle 100.

In the example of FIG. 19, the vehicle 100 is located in a reference lane, the driving direction of the vehicle 100 is tilted at a specific angle to the left, the plurality of parking available spaces is located beside the vehicle 100, and a tilted direction of the plurality of parking available spaces is a direction in which the vehicle 100 needs to reverse for parking. In this case, a space into which the vehicle 100 needs to reverse is a parking space located on the right side of the vehicle 100. Accordingly, the controller 170 may determine that the parking space located on the right side of the vehicle 100 is a predicted parking space.

As the predicted parking space is located on the right side of the vehicle 100, the controller 170 may turn on a right-turn signal of the vehicle 100. Accordingly, other vehicles or pedestrians are able to know an approximate location of the predicted parking space of the vehicle 100. The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A parking assistance system for a vehicle, the parking assistance system comprising:
an object detection apparatus;
at least one processor; and
a computer-readable medium having stored thereon instructions that, when executed by the at least one processor, cause the at least one processor to perform operations comprising:
generating, through the object detection apparatus, information regarding an object located outside the vehicle;
determining, based on the information regarding the object located outside the vehicle, that a parking space available outside the vehicle is a diagonal parking space; and
generating a diagonal parking path for the vehicle to enter the parking space available outside the vehicle,
wherein the object detection apparatus comprises:
a side sensor configured to detect an object located at a side of the vehicle; and
a diagonal sensor configured to detect an object located in a diagonal direction of the vehicle, and
wherein determining that the parking space available outside the vehicle is a diagonal parking space comprises:
based on a determination that a second vehicle is parked beside the parking space available outside the vehicle, and based on a determination that the side sensor does not detect an available parking space and the diagonal sensor detects an available parking space, determining that the parking space available outside the vehicle is a diagonal parking space.

2. The parking assistant system according to claim 1, wherein determining that the parking space available outside the vehicle is a diagonal parking space comprises:
based on a determination that a plurality of parking spaces including the parking space is arranged along a first direction, generating a reference line that is formed along the first direction in which the plurality of parking spaces is arranged; and
determining that the parking space available outside the vehicle is a diagonal parking space based on the reference line of the plurality of parking spaces and based on a side parking line of the parking space.

3. The parking assistant system according to claim 2, wherein generating the reference line of the plurality of parking spaces is based on vertices of the plurality of parking spaces.

4. The parking assistant system according to claim 2, wherein determining that the parking space available outside the vehicle is a diagonal parking space based on the reference line of the plurality of parking spaces and based on a side parking line of the parking space comprises:
determining that an angle between the side parking line of the parking space and the reference line of the plurality of parking spaces is an acute angle or an obtuse angle; and
based on a determination that the angle between the side parking line of the parking space and the reference line of the plurality of parking spaces is an acute angle or an obtuse angle, determining that the parking space available outside the vehicle is a diagonal parking space.

5. The parking assistant system according to claim 2, wherein determining that the parking space available outside the vehicle is a diagonal parking space based on the reference line of the plurality of parking spaces and based on a side parking line of the parking space comprises:
determining that a second vehicle is parked beside the parking space available outside the vehicle;
determining that an angle between a line formed along a length direction of the second vehicle and the reference line of the plurality of parking spaces is an acute angle or obtuse angle; and
based on a determination that the second vehicle is parked beside the parking space and based on a determination that the angle between the line formed along the length direction of the second vehicle and the reference line is an acute angle or an obtuse angle, determining that the parking space available outside the vehicle is a diagonal parking space.

6. The parking assistant system according to claim 1, wherein generating the diagonal parking path for the vehicle to enter the parking space available outside the vehicle comprises:
determining, based on the information regarding the object outside the vehicle, a plurality of parking paths for the vehicle to enter the parking space; and
selecting, as the diagonal parking path, one of the plurality of parking paths based on a user input.

7. The parking assistant system according to claim 6, wherein the operations further comprise:
in response to a selection of one of the plurality of parking paths, adjusting a scale of an AVM screen displayed on a display unit of the vehicle based on a region occupied by the selected parking path.

8. A parking assistance system for a vehicle, the parking assistance system comprising:
an object detection apparatus;
at least one processor; and
a computer-readable medium having stored thereon instructions that, when executed by the at least one processor, cause the at least one processor to perform operations comprising:
generating, through the object detection apparatus, information regarding an object located outside the vehicle;
determining, based on the information regarding the object located outside the vehicle, that a parking space available outside the vehicle is a diagonal parking space; and
generating a diagonal parking path for the vehicle to enter the parking space available outside the vehicle,
wherein generating the diagonal parking path for the vehicle to enter the parking space available outside the vehicle comprises:
determining that a plurality of parking spaces including the parking space available outside the vehicle are arranged in a first direction;
determining a reference lane for the vehicle that corresponds to a designated direction of travel past the plurality of parking spaces; and
generating the diagonal parking path based on a location of the parking space available outside the vehicle, a side parking line of the parking space, the reference lane, and a location of the vehicle.

9. The parking assistant system according to claim 8, wherein generating the diagonal parking path for the vehicle to enter the parking space available outside the vehicle comprises:
   selecting one of a reverse parking maneuver or a forward parking maneuver based on an angle between the side parking line and the reference lane; and
   generating the diagonal parking path based on the selected one of the reverse parking maneuver or the forward parking maneuver.

10. The parking assistant system according to claim 9, wherein selecting one of the reverse parking maneuver or the forward parking maneuver based on the angle between the side parking line and the reference lane comprises:
    selecting the forward parking maneuver based on the angle between the side parking line and the reference lane being an acute angle; and
    selecting the reverse parking maneuver based on the angle between the side parking line and the reference lane being an obtuse angle.

11. The parking assistant system according to claim 9, wherein selecting one of the reverse parking maneuver or the forward parking maneuver based on the angle between the side parking line and the reference lane further comprises:
    based on a determination that a second vehicle is parked beside the parking space available outside the vehicle:
      determining an angle between the reference lane and a line formed along a length direction of the second vehicle;
      selecting the forward parking maneuver based on the angle between the reference lane and the line formed in the length direction of a different vehicle being an acute angle; and
      selecting the reverse parking maneuver based on the angle between the reference lane and the line formed in the length direction of the different vehicle being an acute angle.

12. The parking assistant system according to claim 8, wherein generating the diagonal parking path for the vehicle to enter the parking space available outside the vehicle comprises:
    in a state in which the diagonal parking path comprises a reverse entry into the parking space:
      generating at least a portion of the diagonal parking path to deviate from the direction of the reference lane within a first angular range while forward-driving past the parking space, before reverse-driving into the parking space.

13. The parking assistant system according to claim 1, wherein generating the diagonal parking path for the vehicle to enter the parking space available outside the vehicle comprises:
    based on a determination that a plurality of parking spaces available outside the vehicle are diagonal parking spaces:
      selecting one of the plurality of parking spaces based on a user input; and
      generating a diagonal parking path for the vehicle to enter the selected parking space among the plurality of parking spaces.

14. A parking assistance system for a vehicle, the parking assistance system comprising:
    an object detection apparatus;
    at least one processor; and
    a computer-readable medium having stored thereon instructions that, when executed by the at least one processor, cause the at least one processor to perform operations comprising:
      generating, through the object detection apparatus, information regarding an object located outside the vehicle;
      determining, based on the information regarding the object located outside the vehicle, that a parking space available outside the vehicle is a diagonal parking space; and
      generating a diagonal parking path for the vehicle to enter the parking space available outside the vehicle,
    wherein generating the diagonal parking path for the vehicle to enter the parking space available outside the vehicle comprises:
      based on a determination that a plurality of parking spaces available outside the vehicle are diagonal parking spaces:
        selecting one of the plurality of parking spaces based on a user input; and
        generating a diagonal parking path for the vehicle to enter the selected parking space among the plurality of parking spaces, and
    wherein the operations further comprise:
      outputting, via an output unit of the vehicle, a menu for selecting a manual parking mode or an autonomous parking mode;
      determining a user input that selects one of the manual parking mode or the autonomous parking mode; and
      based on a user selection of the autonomous parking mode, performing a control operation to autonomously park the vehicle along the generated diagonal parking path.

15. The parking assistant system according to claim 14, wherein the operations further comprise:
    based on a determination that a driver of the vehicle is not properly handling a steering wheel of the vehicle, selecting the autonomous parking mode.

16. The parking assistant system according to claim 14, wherein the operations further comprise:
    based on a user selection of the manual parking mode, outputting, via the output unit of the vehicle, parking guide information for manually driving the vehicle along the generated diagonal parking path.

17. A parking assistance system for a vehicle, the parking assistance system comprising:
    an object detection apparatus;
    at least one processor; and
    a computer-readable medium having stored thereon instructions that, when executed by the at least one processor, cause the at least one processor to perform operations comprising:
      generating, through the object detection apparatus, information regarding an object located outside the vehicle;
      determining, based on the information regarding the object located outside the vehicle, that a parking space available outside the vehicle is a diagonal parking space; and
      generating a diagonal parking path for the vehicle to enter the parking space available outside the vehicle,
    wherein the operations further comprise:
      based on a determination that the vehicle is in a reference lane and based on determining a plurality of parking spaces available on both sides of the reference lane that are determined to be diagonal parking spaces:
  determining at least one predicted parking space, based on locations and a tilt direction of the plurality of parking spaces and based on a location and a moving direction of the vehicle; and
  outputting, via an output unit of the vehicle, an image indicating the at least one predicted parking space.

18. The parking assistant system according to claim 17, wherein the operations further comprise:
  outputting, via the output unit, an image indicating at least one parking space other than the predicted parking space from among the plurality of parking spaces.

19. The parking assistant system according to claim 17, wherein the operations further comprise:
  activating a turn signal light corresponding to a direction in which the predicted parking space is located, based on the locations and the tilt direction of the plurality of parking spaces and based on the location and a driving direction of the vehicle.

* * * * *